United States Patent
Wang

(10) Patent No.: US 7,089,214 B2
(45) Date of Patent: Aug. 8, 2006

(54) METHOD FOR UTILIZING A PORTABLE ELECTRONIC AUTHORIZATION DEVICE TO APPROVE TRANSACTIONS BETWEEN A USER AND AN ELECTRONIC TRANSACTION SYSTEM

(75) Inventor: Ynjiun P. Wang, Cupertino, CA (US)

(73) Assignee: eSignX Corporation, Cupertino, CA (US)

( * ) Notice: Subject to any disclaimer, the term of this patent is extended or adjusted under 35 U.S.C. 154(b) by 0 days.

(21) Appl. No.: 10/057,465

(22) Filed: Jan. 25, 2002

(65) Prior Publication Data

US 2003/0004827 A1 Jan. 2, 2003

Related U.S. Application Data

(63) Continuation-in-part of application No. 09/260,384, filed on Mar. 2, 1999, now Pat. No. 6,850,916, which is a continuation-in-part of application No. 09/067,176, filed on Apr. 27, 1998, now Pat. No. 6,282,656.

(51) Int. Cl.
*G06F 19/00* (2006.01)
*G06F 17/60* (2006.01)

(52) U.S. Cl. .............................. 705/64; 705/67; 705/75; 713/182; 380/277; 235/380

(58) Field of Classification Search ................ 713/171, 713/169, 184, 168, 150, 161; 380/259, 277, 380/281, 283; 705/35–44; G06F 17/60
See application file for complete search history.

(56) References Cited

U.S. PATENT DOCUMENTS

| | | | | |
|---|---|---|---|---|
| 4,868,376 A | * | 9/1989 | Lessin et al. | 235/492 |
| 5,495,284 A | * | 2/1996 | Katz | 348/14.09 |
| 5,673,306 A | * | 9/1997 | Amadon et al. | 455/406 |
| 5,679,945 A | * | 10/1997 | Renner et al. | 235/492 |
| 5,815,657 A | * | 9/1998 | Williams et al. | 713/200 |
| 5,917,913 A | * | 6/1999 | Wang | 705/67 |
| 5,991,749 A | * | 11/1999 | Morrill, Jr. | 705/44 |
| 6,175,922 B1 | * | 1/2001 | Wang | 713/182 |
| 6,282,656 B1 | | 8/2001 | Wang | |
| 6,466,780 B1 | * | 10/2002 | Geiselman et al. | 455/411 |
| 6,529,725 B1 | * | 3/2003 | Joao et al. | 455/406 |

(Continued)

FOREIGN PATENT DOCUMENTS

AU 200077342 A * 4/2001

(Continued)

OTHER PUBLICATIONS

Chaplain, Is your wire transfer system secure?, Internal Auditor, v52 n3 p. 56, Jun. 1995.*

(Continued)

*Primary Examiner*—Cuong Nguyen
(74) *Attorney, Agent, or Firm*—Patterson & Sheridan, L.L.P.

(57) ABSTRACT

A method permits a user to conduct a charged transaction utilizing a charge terminal of an electronic transaction system, the charge card terminal being configured to interface with a charge card for the purpose of conducting the charge card transaction. A merchant card is provided to a merchant where the charge card transaction is to be conducted. A charge card terminal at the merchant accepts the merchant card and a pin number or cellular phone number from the user conducting the charge card transaction. The phone number or pin number of the customer causes a call to be placed to a cellular phone of a person required to authorize the charge card transaction.

10 Claims, 15 Drawing Sheets

U.S. PATENT DOCUMENTS

| | | | |
|---|---|---|---|
| 6,529,726 B1 * | 3/2003 | Rhodes | 455/406 |
| 6,532,298 B1 * | 3/2003 | Cambier et al. | 382/117 |
| 6,594,759 B1 * | 7/2003 | Wang | 713/182 |
| 2001/0011250 A1 * | 8/2001 | Paltenghe et al. | 705/41 |

FOREIGN PATENT DOCUMENTS

| | | |
|---|---|---|
| EP | 1 152 378 A2 | 7/2001 |
| EP | 1 152 378 A3 | 7/2001 |
| WO | WO 9721188 A1 * | 6/1997 |
| WO | WO 9746980 A1 * | 12/1997 |
| WO | WO 9832093 A1 * | 7/1998 |
| WO | WO 200124091 A1 * | 4/2001 |
| WO | WO 01/69388 | 9/2001 |
| WO | WO 03/065318 A2 | 8/2003 |

OTHER PUBLICATIONS

Brandon, What you should know about wire-transfer liabilities, Financial Executive, v6, n6, p. 39(5), Nov.-Dec. 1990.*

Carol H. Fancher, In your pocket smartcards, Electronic Payments, IEEE Spectrum, Feb. 1997, Motorola Inc., pp. 47-53.*

Int'l Search Report, Sep. 20, 2001, Ynjiun P. Wang.

* cited by examiner

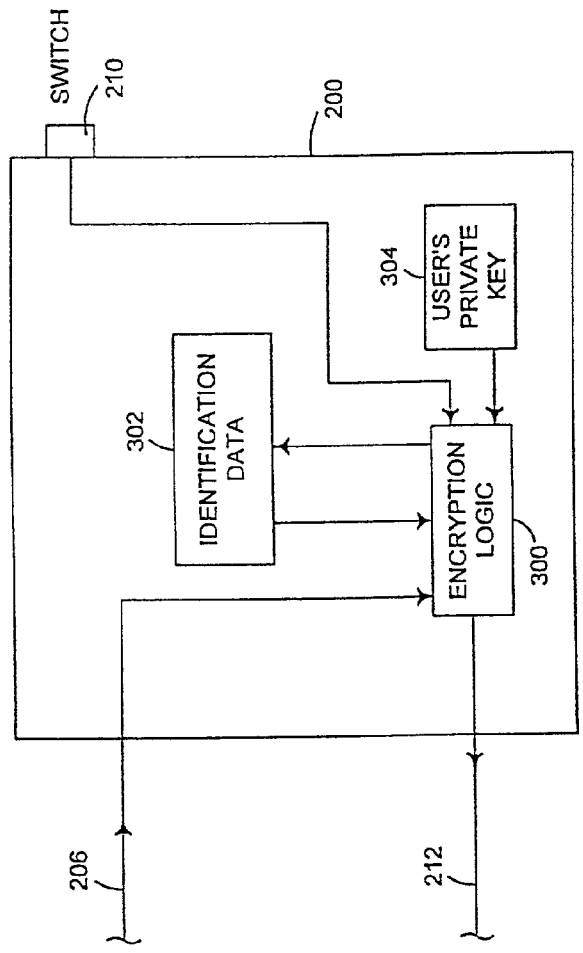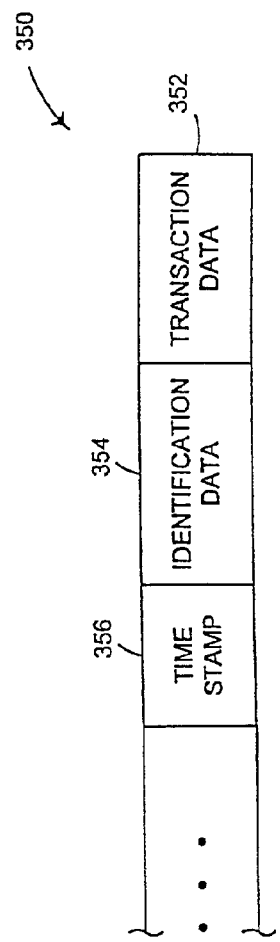
FIG. 3A
FIG. 3B

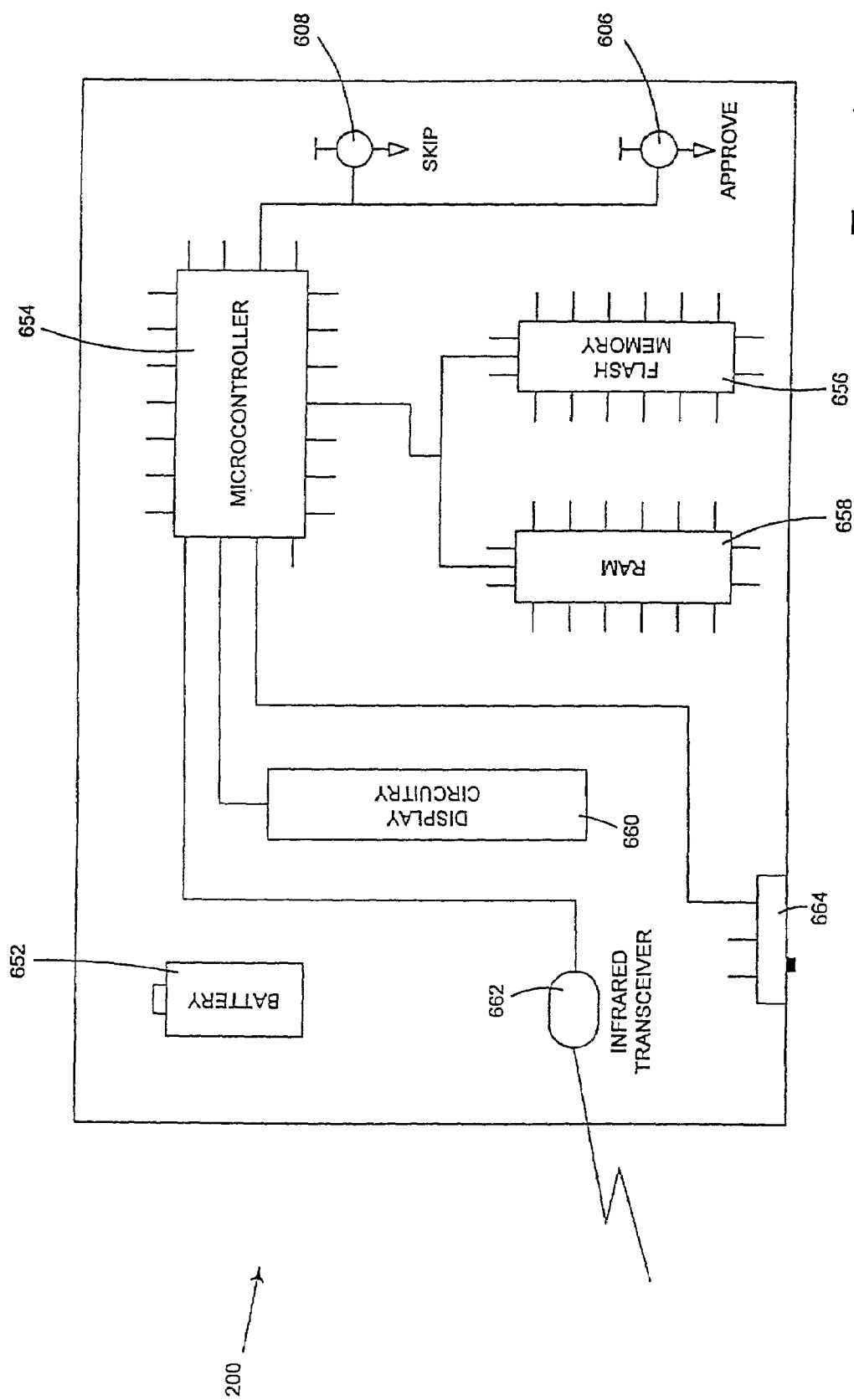

METHOD FOR UTILIZING A PORTABLE ELECTRONIC AUTHORIZATION DEVICE TO APPROVE TRANSACTIONS BETWEEN A USER AND AN ELECTRONIC TRANSACTION SYSTEM

CROSS REFERENCE TO RELATED APPLICATIONS

This application is a continuation-in-part of a patent application entitled Portable Electronic Charge and Authorization Devices and Methods Therefor", filed Mar. 2, 1999, Ser. No. 09/260,384, now U.S. Pat. No. 6,850,916 which is a continuation-in-part of Ser. No. 09/067,176, filed Apr. 27, 1998, now U.S. Pat. No. 6,282,656 entitled Payment System, invented by Ynjiun P. Wang and incorporated herein by reference.

BACKGROUND OF THE INVENTION

Field of the Invention

The invention relates to methods and apparatus for conducting electronic transactions. More particularly, the present invention relates to portable electronic authorization devices (PEADs) which advantageously and substantially eliminate the security risks associate with prior art techniques of approving transactions between a user and an electronic transaction system.

The present invention relates to methods and apparatus for conducting electronic transactions. More particularly, the present invention relates to portable electronic authorization devices (PEADs) which advantageously and substantially eliminate the security risks associated with prior art techniques of approving transactions between a user and an electronic transaction system.

Electronic transaction systems are known. An electronic transaction system typically permits a user to conduct designated transactions electronically, which substantially improves efficiency and convenience to the user. Examples of electronic transactions include transactions conducted via computer networks, automated teller machines (ATM's), automated point-of sale systems, automated library systems, and the like. Transactions conducted via computer networks may encompass a wide range of transactions, including exchanging information and data via a computer network popularly known as the Internet, e.g., to make a purchase from a vendor on the network. ATM's typically permit users to conduct financial transactions (such as withdrawals, transfers, deposits, and the like) vis-à-vis a financial institution in an electronic manner. Automated point-of-sale systems may be employed by merchants to permit users to purchase products or services using the users' electronic account, and automated library systems may be employed to permit library users to check out and return library materials. Other examples of electronic transaction systems are readily available in popular literature and are not enumerated herein for brevity sake.

To enhance security to the user's account, electronic transaction systems typically request the user to provide identification data to authenticate himself as the user authorized to approve the proposed transaction or transactions. If the user fails to provide the requested identification data, the proposed transaction or transactions are not authorized and will not be processed. The identification data may be required with each transaction. By way of example, an automated point-of-sale system may require the user to approve a purchase transaction and will accept an approval message only if it is satisfied that the person approving the transaction has furnished adequate identifying data authenticating himself as the person authorized to perform the approval. Alternatively, the identification data may be entered by the user at the start of a session to authenticate himself and enable that user to subsequently perform any number of transactions without further authentication.

In the prior art, users are typically required to manually enter the identification data into the electronic transaction system for authentication. Typically, the entry of identification data involves typing in a password on a numeric keypad or on a keyboard. The identification data is then compared with data previously stored within the electronic transaction system, and authentication is satisfied when there is a match. As mentioned previously, the transaction or transactions proposed will not be allowed to proceed if there is no match.

Although prior art electronic transaction systems provide some protection from unauthorized access and use of the user's account, there are disadvantages. To illustrate certain disadvantages associated with prior art electronic transaction systems, reference may be made to FIG. 1 herein. FIG. 1 shows an automated teller machine (ATM) 100, representing the requesting device of an electronic transaction system 102. Electronic transaction system 102 may include, for example, a central database 104 database 104 which contains previously-stored identification data and account data of user 106.

To initiate a typical transaction with ATM 100, user 106 first inserts a data card 107, such as a bank card or a credit card, into a card reader 109. Data card 107 typically includes a magnetic stripe that contains the account number and other information related to the user, which may then be read by card reader 109. The data stored in data card 107 enables electronic transaction system 102 to ascertain which account in database 104 user 106 wishes to transact business.

Via a keypad 108 on ATM 100, user 106 may then be able to enter his identification data, e.g., his personal identification number (PIN), to authenticate himself. If the entered identification data matches the identification data stored with the account in database 104 that is identified by data card 107, the user is authenticated and granted access to his account. If there is no match, authentication fails. After authentication, user 106 may be able to, for example, employ a combination of keypad 108 and a screen 110 to withdraw cash from his account, which results in cash being dispensed from ATM 100 and the balance in his account within database 104 correspondingly reduced.

Theoretically, the identification data entered into ATM 100 should be secure. In reality, there are many potential security risks to the identification data in prior art authentication techniques. Since the identification data is not encrypted before being entered into ATM 100, the non-encrypted identification data is vulnerable to unauthorized access and procurement. Encryption of the identification data is not practical in the prior art since it would have been too complicated and/or inconvenient for the user to perform encryption or memorize the encrypted identification data. Unauthorized procurement of the identification data in the prior art may occur, for example, upon entry if it is inadvertently seen by another party, e.g., by another person behind user 106, either on screen 110 or more likely at keypad 108.

Even if encryption is employed on the identification data in the prior art, e.g., prior to transmission from ATM 100 to database 104, the encryption typically occurs within ATM 100 and still requires the entry of non-encrypted identification data from user 106 and the existence of the identification data for some duration of time in ATM 100. Unauthorized access to the identification data may then occur if an unauthorized party is able to gain entry into ATM 100 and intercepts, e.g., via software or hardware implemented in ATM 100, the non-encrypted identification data therein.

Furthermore, if public key cryptography is employed within ATM 100, the storage of the user's private key within ATM 100 renders this private key vulnerable to theft, further exposing the user's account to risk. The stolen password and/or private key may then be employed to allow unauthorized persons to access the user's account to the user's detriment.

In view of the foregoing, there are desired apparatus and methods for conducting transactions with the electronic transaction system while substantially eliminate the risk of unauthorized access to the user's account and unauthorized procurement of the user identification data. Preferably, such an apparatus should be easily portable to permit the user to conveniently and comfortably perform transaction authentication anywhere.

SUMMARY OF THE INVENTION

A method is disclosed for permitting a user to conduct a charged transaction utilizing a charge terminal of an electronic transaction system, the charge card terminal being configured to interface with a charge card for the purpose of conducting the charge card transaction, providing a merchant card to a merchant where the charge card transaction is to be conducted, comprising accepting at a charge card terminal for the merchant where the charge card transaction is to be conducted to accept the merchant card and a pin number or cellular phone number from the user conducting the charge card transaction, detecting the use of the merchant card at a central processing area, in response to said detection step, utilizing the phone number or pin number to cause a call to be placed to a cellular phone of a person required to authorize the charge card transaction, sending a report of the users charge card transaction to the cellular phone, and authorizing approval of the charge card transaction back to the merchant's charge card terminal only upon approval by the authorized person.

The merchant may further enter the amount to be charged and an identification of the type transaction being conducted.

The merchant card may be assigned a valid credit card number, the valid credit card number of the merchant being detected to initiate the step of calling the authorizing persons cellular phone.

The method may comprise the further step of filtering all credit card transactions from the charge card terminal of the merchant through a central processing server, and in response to that filtering step, if the card number received from the merchant is not a unique merchant assigned number, then the server does nothing, or if the card number is a unique merchant assigned number, then look up information in the database in the payment server using the phone number or pin number as the index.

The method may also comprise the payment server using the transaction associated phone number or pin number as an index to a database which stores a cellular phone number for the person required to authorize the transaction.

In the method the database may further store a record of whether the authorizer cellular phone has an imbedded PEAD. Upon determining that the authorizing person's cellular phone has a PEAD, the server sends a transaction message to the authorizing person's phone for approval using a PEAD imbedded in the phone, the authorizing person approving the transaction by entering a pin number at the cellular phone.

If the database lookup indicates that the authorizing person's cellular phonies a touchtone phone, then the server will send a message to the authorizing person's cellular phone requesting a dial tone for approval.

The database server may utilize an interactive voice response system to convey the transaction information to the authorizing person's cellular phone.

Upon the authorizing person authorizing/approving the transaction, a settlement may be; made to the authorizing person's account utilizing an account selected from the group comprising a credit card, an ATM, a bank account or a debit card.

BRIEF DESCRIPTION OF THE DRAWINGS.

To facilitate discussion,

FIG. 3A shows, in one embodiment of the present invention, a simplified schematic of the PEAD of FIG. 2.

FIG. 3B shows, in one embodiment, the format of representative transaction approval data.

FIG. 6B illustrates, in a simplified manner and in accordance with one aspect of the present invention, the hardware for implementing the PEAD of FIG. 6A.

DETAILED DESCRIPTION OF THE PREFERRED EMBODIMENT

The present invention further relates to a Payment System (EPS) for conducting a payment with a phone number and using a PEAD or a cellular phone to approve the payment. In order to integrate into the existing Point-of-Sales system, a valid credit card number is reserved as an eSignX Merchant Card number (EMC number). For a user registered his phone number (preferably his/her cellular phone number) in the eSignX Payment System, can pay at the Point-of-Sales by giving his phone number to a merchant. A merchant can swipe the eSignX Merchant Card (EMC) and then enter a customer cellular phone number, amount to charge and other optional information. Since the EMC number is a valid credit card number, therefore the phone number and charging information will route through the existing payment settlement infrastructure such as Visa or MasterCard and will be processed by existing data processor such as First Data Corp. (FDC). The current invention only need to install an eSignX Payment Server in the existing infrastructure to capture the unique EMC number by filtering all the charging card numbers route through the system. If the card number is not the unique EMC number, then do nothing. If the card number is the unique EMC number, then look up the database in the eSignX Payment Server using the phone number as the index. If the lookup result indicates that the user's cellular phone has a PEAD embedded such as a WAP phone with WIM card or SWIM card or a Java Phone with xDSM software PEAD module, then the eSignX Payment Server will send a transaction message to user's phone for approval using a PEAD embedded in the phone. If the lookup result indicates that the user's cellular phone is a touch tone phone, then the eSignX Payment Server will go through an IVR (Interactive Voice Response) system to call the user's cellular phone for dial tone PIN for approval.

Figure 12:
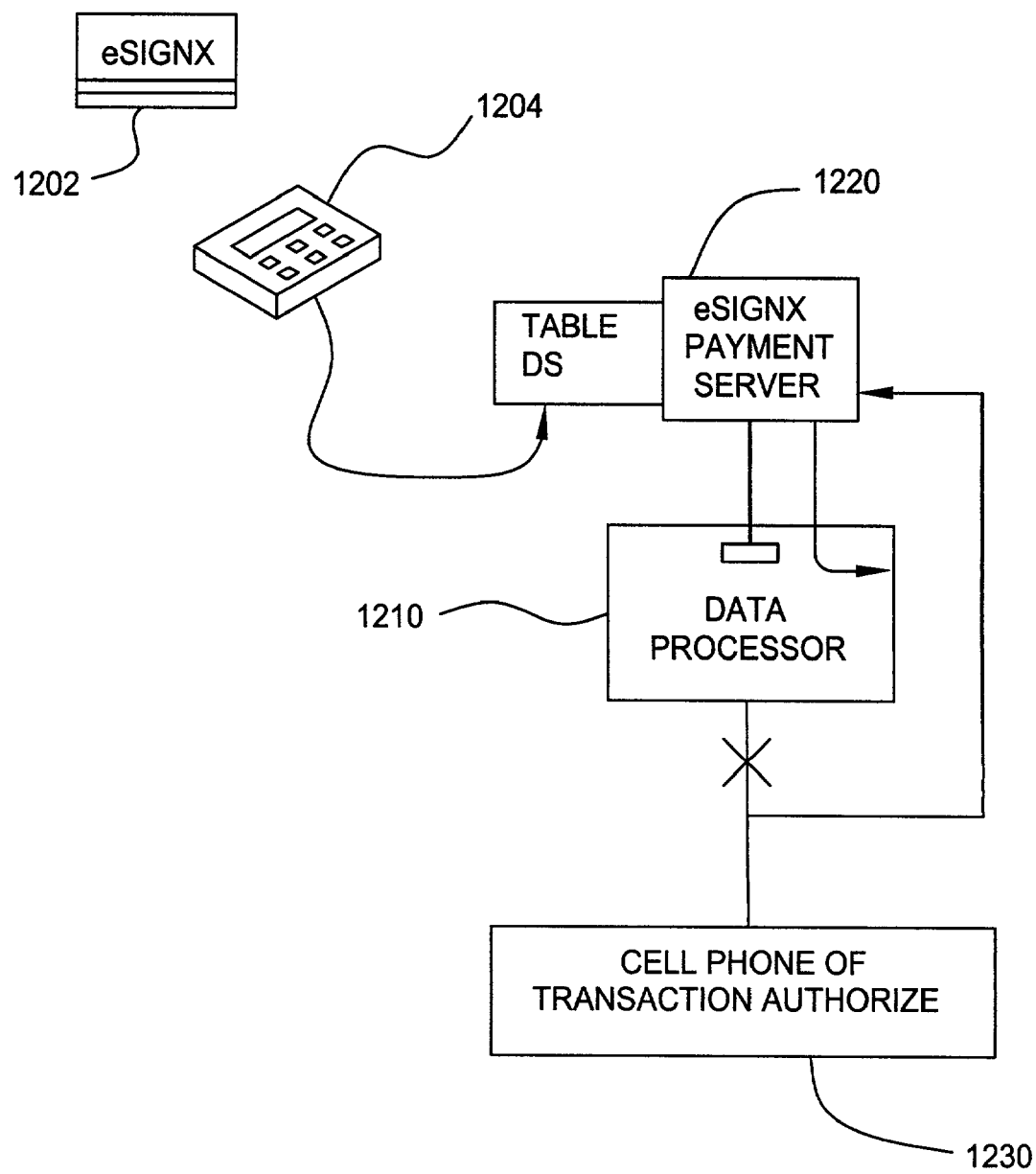
FIG. 12 is a schematic diagram of the method and apparatus of this invention.

A sample transaction can be understood by reference to the block diagram of FIG. 12 which illustrates those basic physical elements of this embodiment as well as the data flow in the use of this method and apparatus. As a first step, when a transaction is to be authorized at a merchant, for a user of this system to pay at the point-of-sale, the user simply registers his phone number, which is preferably his or her cellular phone number in the eSignX payment system prior to the transaction, and then pays at the point-of-sale by giving this phone number to the merchant. Of course, it would be equivalent to also register a pin number and give a pin number to the merchant.

In either case, having received the pin number of cellular phone number, the merchant swipes a merchant card issued by eSignX in a standard card swipe machine 1204 which would be of the same type as is currently used to swipe credit cards. After swiping the merchant card, the merchant then enters the customer cellular phone number (or pin number), the amount to charge, and other optional information.

Since the EMC number read by the machine 1204 is a valid credit card number, then the phone number and charging information can be routed through the existing payment settlement infrastructure such as used by Visa or MasterCard, and processed by an existing data processor, such as First Data Corporation, which maintains a large-scale data processing center 1210 to which the entered data is directed.

In addition to the data processing already conducted at this center, the current approach only needs the installation at this site 1210 or another of a payment server dedicated to capturing the data entered using the EMC merchant card 1202. This can be done using a server 1220 which can be incorporated into the main data processing center 1210 either before or after the data processing normally conducted at the credit card data processing center. The function of the payment server 1220 in the existing infrastructure is to capture the unique merchant indication (EMC) number from the merchant card 1202, preferably by filtering all charging card numbers routed through the system. If the card number is not a unique EMC number from an EMC card 1202, then the merchant card payment server, 1220 does nothing.

If the card number is a unique merchant (EMC) number, then the data is immediately diverted to the EMC payment server 1220; to look up in the database all available information relating to the person who must authorize the transaction (which may or may not be the issuer) in the payment server using the phone number or pin number as the index.

Approval can then concurrently with the transaction being conducted from the cellular phone 1230 to which the cellular phone number or pin is directed; this may or may not be a cellular phone held by the person seeking to conduct a transaction.

If the lookup result at the payment server 1220 indicates that the user's cellular phone has a PEAD imbedded such as a WAP phone or WIM card, SWIM card or Java phone with xDSM software PEAD module, then the payment server 1220 sends a transaction message to the authorizer's phone 1230 for approval using a PEAD imbedded in the phone. Upon the holder of the cellular phone with the PEAD receiving the message, they can enter an approval code, or ignore the message or enter a disapproval code.

In the alternative, if the lookup result indicates that the user's cellular phone is a touchtone phone, then the payment server 1220 sends a message or goes through an interactive voice response system to call the user's cellular phone to request a dialin pin of approval.

In either case, the holder of the cellular phone 1230 with which the cellular phone number or pin number is associated, maintains control of the approval of the transaction, whether or not they are present at the site of the transaction.

Figure 2:
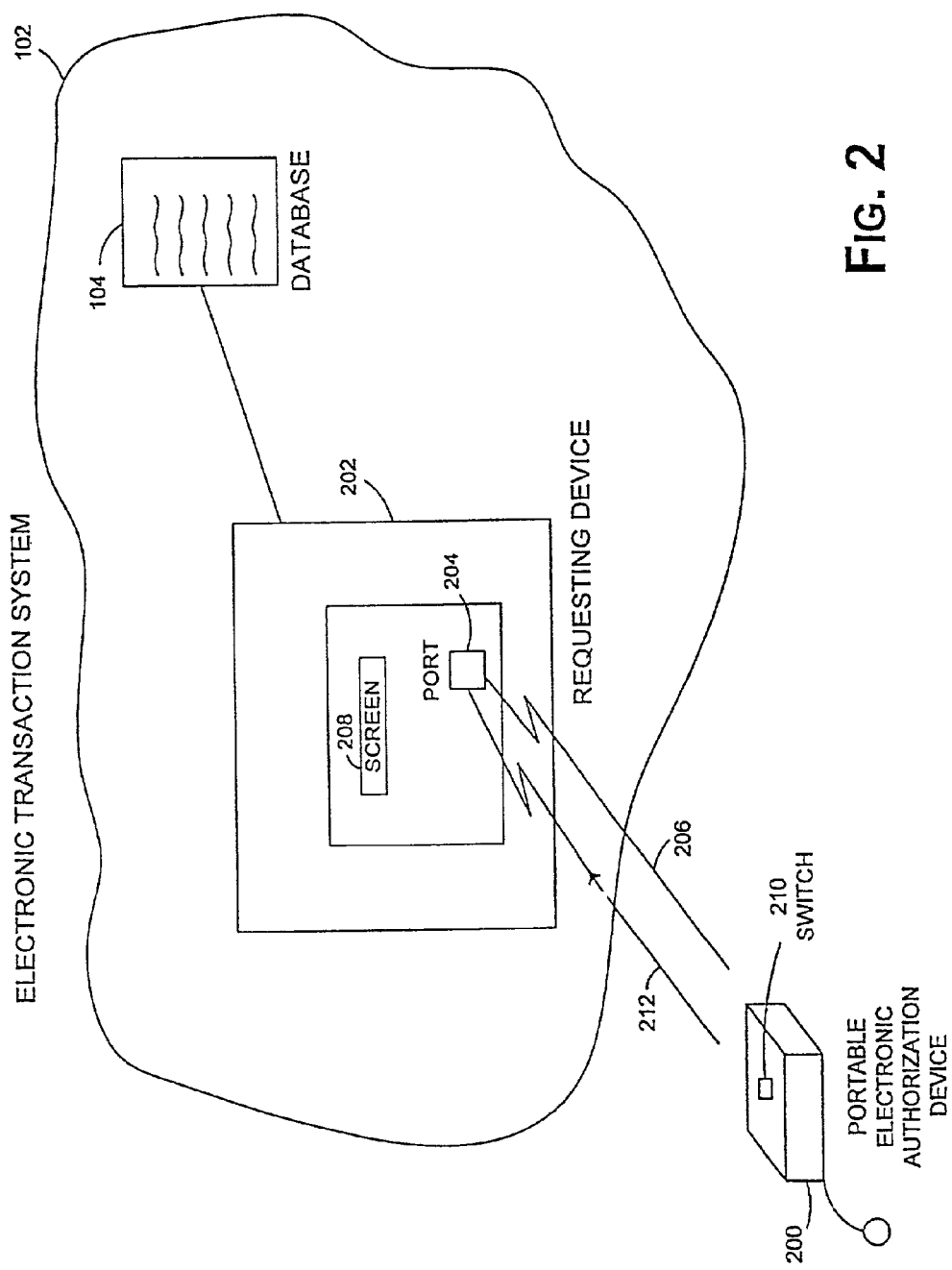
FIG. 2 illustrates, in accordance with one embodiment of the present invention, a portable electronic authorization device (PEAD), representing the apparatus for securely approving transactions conducted vis-à-vis an electronic transaction system.

FIG. 2 illustrates, in accordance with one embodiment of the present invention, a portable electronic authorization device (PEAD) 200, representing the apparatus for securely approving transactions conducted vis-à-vis an electronic transaction system. With reference to FIG. 2, requesting device 202 may initiate a transaction approval process with PEAD 200 by transmitting to PEAD 200, via communication port 204, a transaction request pertaining to a proposed transaction. Requesting device 202 may represent, for example, an ATM machine, a computer terminal in a network, an automated library check-out terminal, or similar devices for permitting the user to transact business with the electronic transaction system. The proposed transaction may be, for example, a sale transaction of a particular item for a certain amount of money. The transaction request itself may include, for example, the transaction ID, the merchant's name, the merchant's ID, the time of the proposed purchase, and the like. In one embodiment, the transaction request from requesting device 202 may be encrypted for enhanced security but this is not required. Data pertaining to the proposed transaction reaches PEAD 200 via path 206 in FIG. 2.

Port 204 may represent an infrared port to facilitate infrared communication with PEAD 200. Alternatively, port 204 may represent a wireless port for facilitating wireless communication. Port 204 may even represent a contact-type connection port, such as a magnetic read/write mechanism or a plug having electrical contacts for directly plugging PEAD 200 into port 204 to facilitate communication. Other techniques to facilitate communication between requesting device 202 and PEAD 200 are readily appreciable to those skilled.

The data pertaining to proposed transaction(s) may then be reviewed by the user, either on a screen 208 of requesting device 202 or optionally on a display screen provided with PEAD 200 (not shown in FIG. 2). If the user approves the transaction, e.g., a purchase of an item for a given amount of money, the user may then signify his approval by activating a switch 210 on PEAD 200, which causes an approval message to be created with the user's identification data, encrypted and transmitted back to requesting device 202 via path 212. If the transaction is not approved, the user may simply do nothing and let the transaction request times out after an elapsed time or may activate another switch on PEAD 200 (not shown in FIG. 1), which causes a reject message, either encrypted or non-encrypted, to be transmitted back to the requesting device 202 via path 212.

Figure 1:
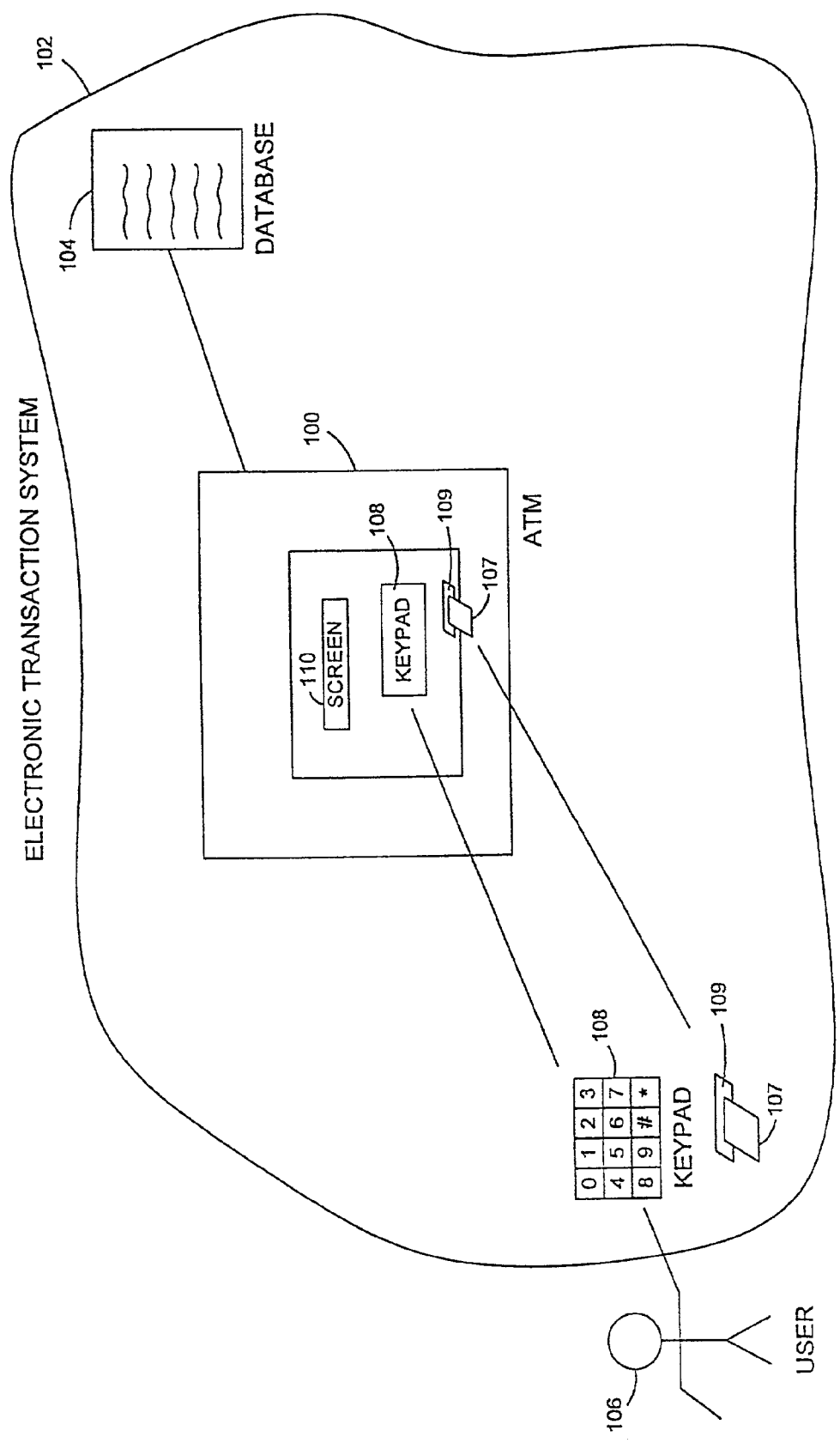
FIG. 1 shows a prior art electronic transaction system, including an automated teller machine (ATM).

The present invention is different from the prior art technique of FIG. 1 in that the user is required in the prior art to enter his identification data into the electronic transaction system, e.g., into ATM 100, to authenticate himself. In contrast, the present invention keeps the identificatin data related to the user secure within PEAD 200 at all times. Transaction approval occurs within PEAD 200, and the data representing such approval is encrypted, again within PEAD 200, prior to being transmitted to the elctgronic transaction system, e.g., to requesting device 202 in FIG. 2.

Accordingly, even if the approval data is intercepted, its encryption would prevent unauthorized users from employing the identification data for illicit purposes. If publickey cryptography is employed to encrypt the approval data the user's private key is also always kept within PEAD 200. Since the user's private key is required for encryption and is unknown to others, even to the electronic transaction system in one embodiment, the encrypted approval dta, if intercepted, would be useless to unauthorized third parties even if the approval data can be deciphered using the user's public key. Again, this is different from prior art authentication techniques wherein encryption takes place within the electronic transaction system and requires the entry of the identification data and/or reading the user's private key from the ID card such as an ATM card, a credit card, and the like. As mentioned earlier, the fact that the prior art electronic transaction system requires this identification data and/or user's private key exposes these data to risks, e.g., if the requesting device is not secure or open to data interception via software or hardware.

As another difference, the present invention employs the circuitries within the portable electronic authorization device (PEAD) to perform the approval and encryption of the transaction approval data within the PEAD itself. In contrast, prior art data cards are essentially passive devices. For example, prior art ATM cards or credit cards only has a magnetic stripe for storing account information and do not have any facility to perform approval and/or encryption of the transaction approval data. While smart cards of IC cards, which are currently being developed, may contain electronic circuitries, current standards for their implementation still requires a reader associated with the requesting device to read out the identification data and/or user's private key in order for the requesting device to perform any approval and/or encryption. As mentioned earlier, the transmission of these data to the requesting device unnecessarily exposes these data to risks of theft and/or unauthorized interception once transmitted.

It should be borne in mind at this point that although public key cryptography is discussed throughout this disclosure to facilitate ease of understanding and to highlight a particular aspect of the invention, the overall invention is not limited to any particular cryptography algorithm and may be implemented using any conventional cryptography technique, including public key cryptography algorithms such as RSA, Diffie-Hellman, other discrete logarithm systems, elliptic curve systems, or the like. For additional information on some of the different public key cryptography techniques, reference may be made to, for example, the IEEE P1363/D8 Standard Specifications for Public Key Cryptography dated Oct. 5, 1998, available from IEEE Standards Dept. 345 East $7^{th}$ Street, New York, N.Y. 10017-2349.

As mentioned, transaction approval in the prior art occurs within the electronic transaction system. In contrast, the present invention allows transaction approvals to occur within PEAD 200. The fact that transaction approvals occur entirely within PEAD 200 provides many advantages. By way of example, this feature eliminates the need to have, in one embodiment, the identification data and/or the user's private key in the requesting device. The fact that transaction approvals occur entirely within PEAD 200 (using the user identification data and/or the user's private encryption key that are always kept secure within PEAD 200) substantially enhances the confidentiality of the user identification data and the user's private key, as well as the integrity of the transaction approval process.

Since approval occurs entirely within PEAD 200, the user identification data that is employed to authenticate transactions may be more complicated and elaborate to ensure greater security. By way of example, the user identification data may be more elaborate than a simple password and may include any of the user's name, his birth date, his social security number, or other unique biometrics or unique identifying data such as fingerprint, DNA coding sequence, voice print, or the like. In contrast, prior art authentication techniques limit the user identification data to simple patterns, e.g., simple password of few characters, that are easily memorized by the user since more elaborate identification data may be too difficult to remember or too cumbersome to manually enter. Furthermore, even if the complicated ID data may be stored in the prior art data card, it is still required to be read into the requesting device of the electronic transaction system, again exposing this data to interception or theft once read.

Additional safeguards, which will be described in detail herein, may also be provided to prevent access, whether electronically or by physical means, to the user identification data and/or the user's private key within PEAD 200. Since the identification data and/or the user's private key are never exposed, security risks to the these data are substantially minimized.

FIG. 3A shows, in one embodiment of the present invention, a simplified schematic of PEAD 200 of FIG. 2, including switch 210. Data path 206 is provided for receiving transaction requests from the electronic transaction system, and data path 212 is provided for transmitting transaction approval data back to the electronic transaction system. It should be borne in mind that although two data paths and other data paths herein may, in one embodiment, represent logical data paths and may be implemented via a single physical data connection. Likewise, the different ports herein may represent, in one embodiment, logical data ports for ease of understanding and may in fact be implemented using a single physical port.

When a transaction request, e.g., a withdrawal transaction from an ATM machine in the amount of $200.00, is transmitted via data path 206 to PEAD 200, this transaction is received by encryption logic 300. At this point, the user may review the proposed transaction, e.g., via the display screen provided with the electronic transaction system and/or PEAD 200, and has a choice to either approve or disapprove the proposed transaction. If the user approves the transaction, he may, in one embodiment, activate a switch 210, which causes the transaction approval data to be created and then encrypted by encryption logic 300 prior to being transmitted back to the electronic transaction system via path 212.

Note that the user identification data block 302, which is employed in the transaction approval process, is not directly coupled to paths 206 and 212. In other words, the memory portion storing the user identification data is intentionally decoupled from the input and output ports of PEAD 200 to prevent direct access thereto.

If access to user identification data 302 is desired, e.g., to approve a transaction, the access can only be made by encryption logic block 300. Likewise, it is not possible to directly access the memory portion 304, which stores the user's private key. If access to user's private key 304 is desired, e.g., to encrypt the transaction approval data, the access can only be made by encryption logic block 300. It should be borne in mind that although user identification 302 and user's private key 304 are shown stored in different memory portions, such illustration is made for ease of understanding and both of these may in fact be stored, in one embodiment, at different addresses on the same memory module.

In some cases, the transaction approval data requires the inclusion of certain pieces of identification data 302. For example, a transaction embodied in the transaction request from the electronic transaction system may be appended with data representative of an "electronic signature" prior to being encrypted and retransmitted back to the electronic transaction system. FIG. 3B shows, in one embodiment, the format of representative transaction approval data 350. With reference to FIG. 3B, transaction data 352, representing a portion of or the entire transaction request received from the electronic transaction system, is appended with certain user identification data 354 and optionally a time stamp 356. The formation of transaction approval data 350 only occurs if the transaction request has already been approved by the user. Once appended, transaction approval data 350 is then encrypted prior to being retransmitted back to the electronic transaction system.

In some cases, it may be desirable to encrypt the transaction request prior to transmission to the PEAD to further enhance security. For example, certain transaction partners, e.g., venders or other users on the computer network, may wish to keep the information within a transaction request confidential and may prefer to encrypt the transaction request before furnishing it to the PEAD. Data encryption is also desirable when, for example, the user identification data and the user's private key is written into a blank PEAD for the first time to configure a PEAD that is unique to a given user. The configuration data pertaining the user identification data and the user's private key, while must be written only once into the PEAD 200 by the user of PEAD 200, is preferably encrypted to render them less vulnerable to theft. Issuers of PEAD 200 may represent, for example, credit card users, the government, or any other institution with whom the user maintains and account.

Figure 4:
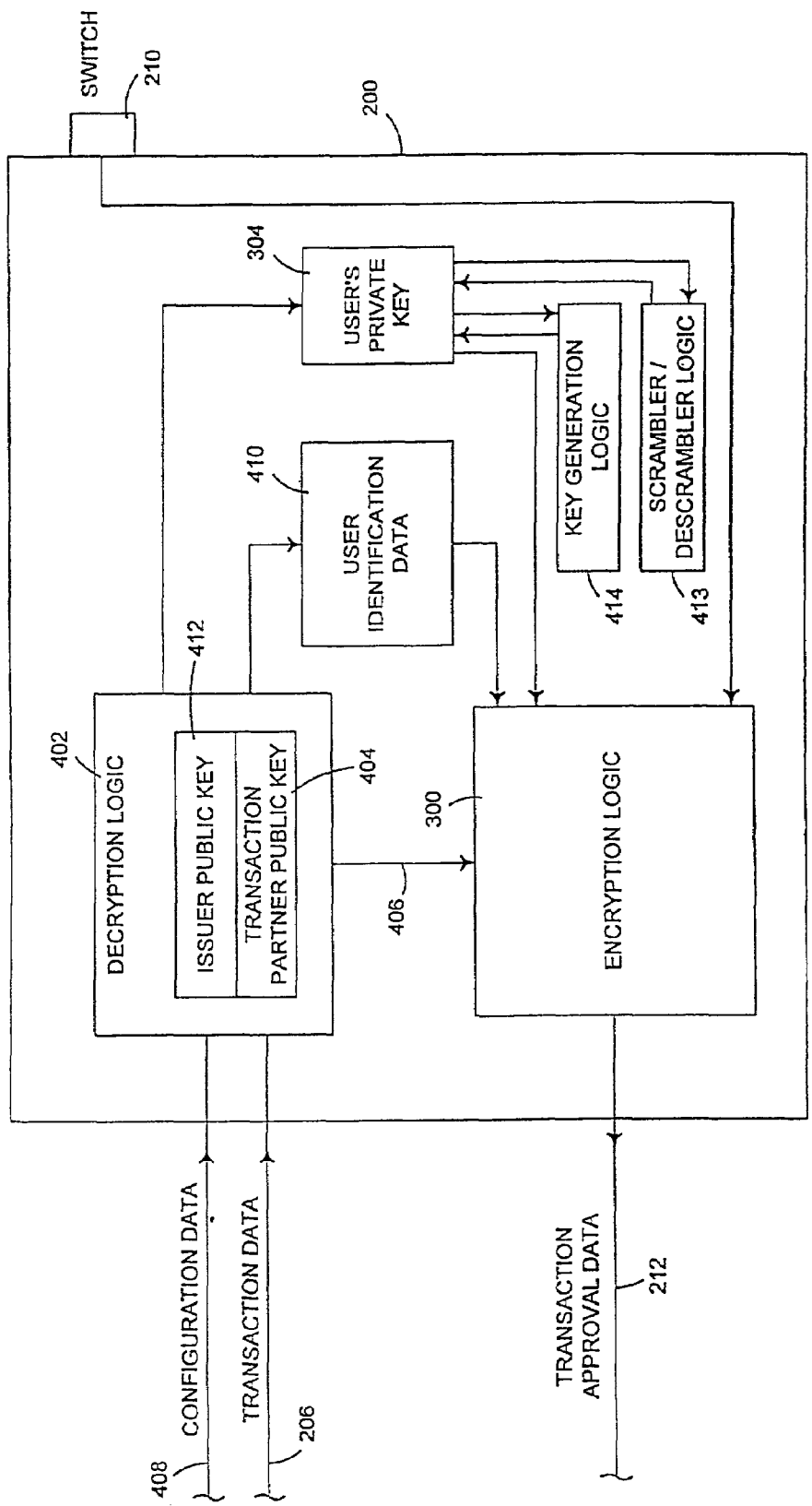
FIG. 4 illustrates, in accordance with one embodiment of the present invention, a logic block schematic of the PEAD.

FIG. 4 illustrates, in accordance with one embodiment of the present invention, a schematic of PEAD 200 of FIG. 2. The PEAD 200 of FIG. 4 further employs decryption logic for receiving the encrypted configuration data and optionally the encrypted transaction requests. In FIG. 4, encryption logic 300, user's private key 304, and data paths 206 and 212 are arranged and function substantially as discussed in connection with FIG. 3A.

Transaction requests are normally non-encrypted, i.e., they are received and processed in the manner discussed in connection with FIG. 3A. For highly sensitive transactions, however, the transaction requests may be encrypted and transmitted to PEAD 200 via data path 206 and input into decryption logic 402 to be decrypted. If a public key cryptography is employed, the encrypted transaction requests may be decrypted with a transaction partner public key 404.

Once decrypted, the transaction request is then displayed to the user for approval. The transaction approval data may be furnished to encryption logic 300 via path 406 to be encrypted if approved, e.g., responsive to the activation of switch 210. The encryption is preferably performed with the users private key 304 if a public key cryptography technique is employed, and the encrypted transaction approval data is then transmitted back to the electronic transaction system via data path 212.

As configuration data typically includes sensitive user identification data and user's private key, it is often encrypted prior to being transmitted to PEAD 200 via data path 408. The encrypted configuration data is received by decryption logic 402 and decrypted therein prior to being written into user identification data block 410 and user's private key block 304. If public key cryptography is employed, the encrypted configuration data may be encrypted by the user's private key in the electronic transaction system prior to transmission and decrypted once received by PEAD 200 with an issuer public key 412.

Note that once the configuration data is decrypted and written into user identification data block 410 and user's private key block 304, the user identification data and user's private key can only be accessed subsequently by encryption logic 300. Also note that there is no direct connection from any of the I/O data paths, e.g., data path 206, 212, or 408, to user identification data block 410 as well to user's private key block 304. Advantageously, the sensitive user identification data and user's private key therein are not susceptible to access from outside once written into respective blocks 410 and 304 (which may, in one implementation, simply represent memory blocks in PEAD 200's memory).

Additionally, the user identification data and the user's private key cannot be updated by those not having the issuer's private key. As represented in FIG. 4, data can only be written into user's private key block 304 and user identification bloc 410 after it is decrypted via decryption logic 402 with issuer public key 412. Accordingly, unless the updated configuration data has been encrypted using the issuer's private key (which is presumably highly secure), the updated configuration data will not be decrypted and written into respective blocks 304 and 410. Of course if the configuration data within blocks 304 and 410 cannot be updated physically, e.g., they are stored using memory that can be written only once such as PROM (programmable read-only memory), WORM (write once, read many), or the like, the security consideration associated with unauthorized alteration of configuration data is substantially eliminated.

If a greater level of security is desired, the user's private key may be optionally be scrambled or randomized prior to being written into user's private key block 304 by optional scrambler/descrambler logic 413. Scrambler/descrambler logic 413 may, in one embodiment, receive the user's private key, which is furnished by the institution that issues PEAD 200 to the user, and scrambles and/or randomizes it to generate yet another user's private key and a corresponding user's public key. This scrambled/randomized user's private key is then stored in user's private key block 304, which is now unknown even to the issuer of PEAD 200, and the corresponding user's public key may be made known to the issuer and/or the transaction partners to facilitate transactions. Advantageously, there is no other copy of the scrambled/randomized user's private key anywhere else beside within user's private key block 304.

In an alternative embodiment, there may be employed an optional key generation logic 414 which, responsive to a request from the issuing institution, generates the user's private key and the user's public key on its own, i.e., without first requiring the receipt of a user's private key from the issuing institution and randomizing it. The generated user's private key is then stored in private key block 304 and the public key is made known to the issuing institution and/or the transaction partners to facilitate transactions. In this manner, no version of the user's private key, whether randomized or not, exists outside the PEAD itself. As can be appreciated by those skilled in the art, the use of key generation logic 414 further enhances the confidentiality of the user's private key.

Figure 5A:
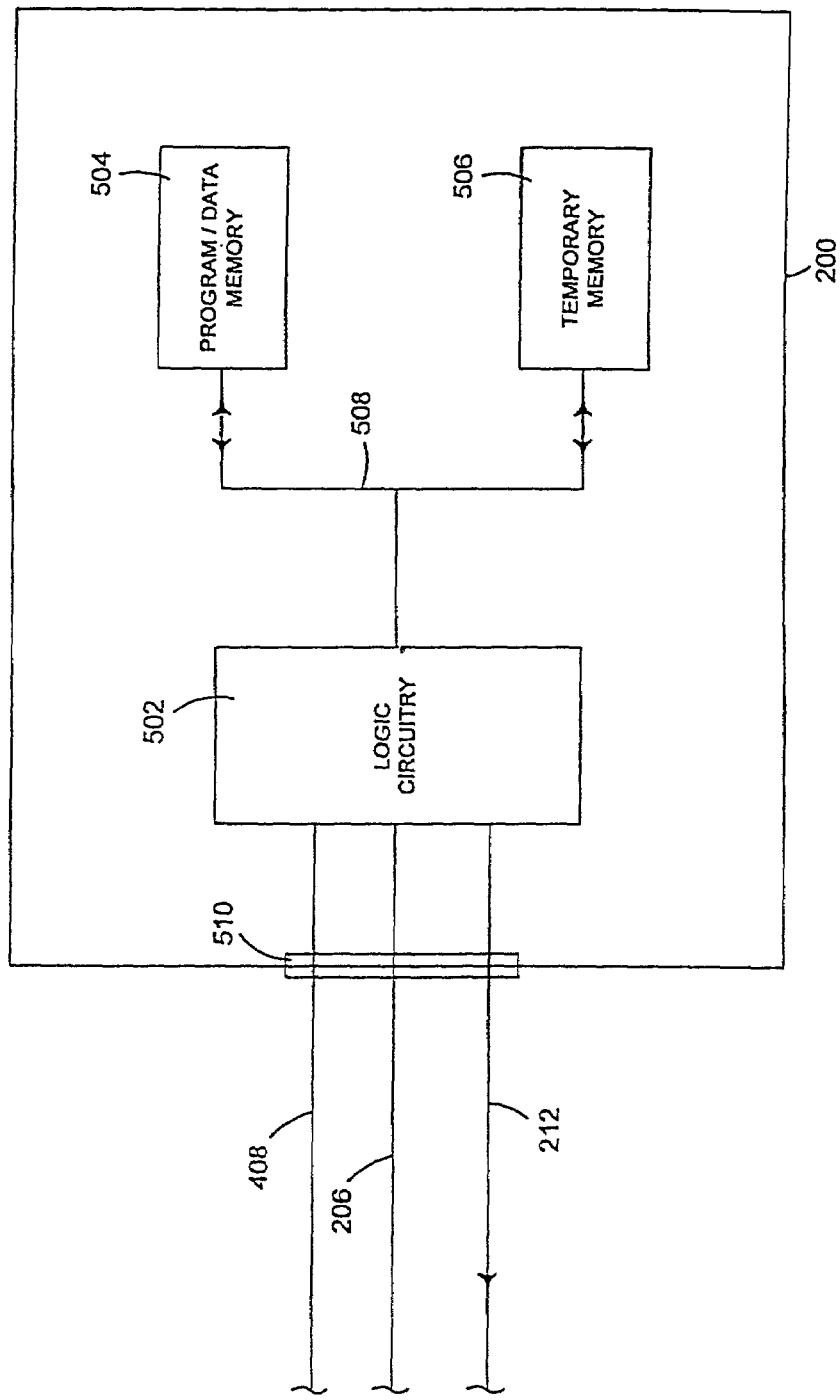
FIG. 5A represents, in accordance with one embodiment of the present invention, a high level hardware implementation of the PEAD.

FIG. 5A represents, in accordance with one embodiment of the present invention, a high level hardware implementation of PEAD 200. As shown in FIG. 5A, PEAD 200 includes logic circuitry 502, which may represent a central processing unit such as a microprocessor or a microcontroller, discrete logic, programmable logic, an application-specific integrated circuit (ASIC), or the like, for implementing encryption logic 300 of FIG. 2 and optionally decryption logic 402 of FIG. 4.

Program/data memory 504 stores, among others, the codes which operate PEAD 200 as well as the user identification data and the user's private key. Program/data memory 504 is preferably implemented using some form of non-volatile memory (NVM) such as flash memory, electrically programmable read-only memory (EPROM), electrically erasable, programmable read-only memory (EEPROM), or the like. Temporary memory 506 serves as a scratch pad for calculation purposes and for temporary storage of data, and may be implemented using some form of random access memory (RAM) such as static RAM or dynamic RAM, which are known in the art. Alternatively, either optical memory, magnetic memory, or other types of memory may be employed to implement program/data memory 504 and/or temporary memory 506.

A bus 508 couples program/data memory 504 and temporary memory 506 with logic circuitry 502. Communication port 510 represents the communication gateway between PEAD 200 and the electronic transaction system and may be implemented using infrared technology wireless RF technology, a magnetic read/write head, a contact-type plug for facilitating serial or parallel data transmission, or the like. Communication port may also represent, in one embodiment, a PC card port (popularly known to those skilled as a PCMCIA card). Data path 206 inputs transaction requests into logic circuitry 502 while data path 212 outputs transaction approval data from logic circuitry 502 to the electronic transaction system. Optional data path 408, which has been described in FIG. 4, inputs configuration data into PEAD 200 to write the user identification data and the user's private key into program/data memory 504 to uniquely configure PEAD 200 to a particular user.

Again, note that access to program/data memory 504 and the data therein (e.g., the user identification data and the user's private key) can only be made by logic circuitry 502. For example, the user identification data and the user's private key can only be written into program/data memory 504 if this data has been properly encrypted with the issuer's private key. Access to these memory blocks for writing thereto may also be restricted by logic circuitry 502 under appropriate software and/or firmware control.

Similarly, reading the user identification data and accessing the user's private key can only be accomplished via the encryption logic of logic circuitry 502. The advantages to security of this aspect has been discussed in connection with FIGS. 3A and 4, the most important point being there is preferably no direct access to the sensitive user identification data and user's private key from the outside. Consequently, the confidentiality and security of these data items are greatly enhanced with the inventive design.

Some type of power source, such as a battery, may be provided as well. If PEAD 200 is implemented as a single-chip design, i.e., substantially all components shown in FIG. 5A are fabricated on a single die, then power is external to the die itself. If contact-type communication is employed, e.g., if PEAD 200 must be plugged into the electronic transaction system to conduct transactions, power external to the PEAD may be employed for transaction approvals when plugged in, thereby eliminating the size, weight, and cost penalties associated with having a battery onboard the portable transaction apparatus.

In one embodiment, PEAD 200 may be implemented using a general purpose portable computing device, such as any of the miniaturized portable computers or personal digital assistants (PDA's thar are currently popular. A PDA such as the Apple Newton®, for example, may be employed to implement PEAD 200.

Figure 5B:
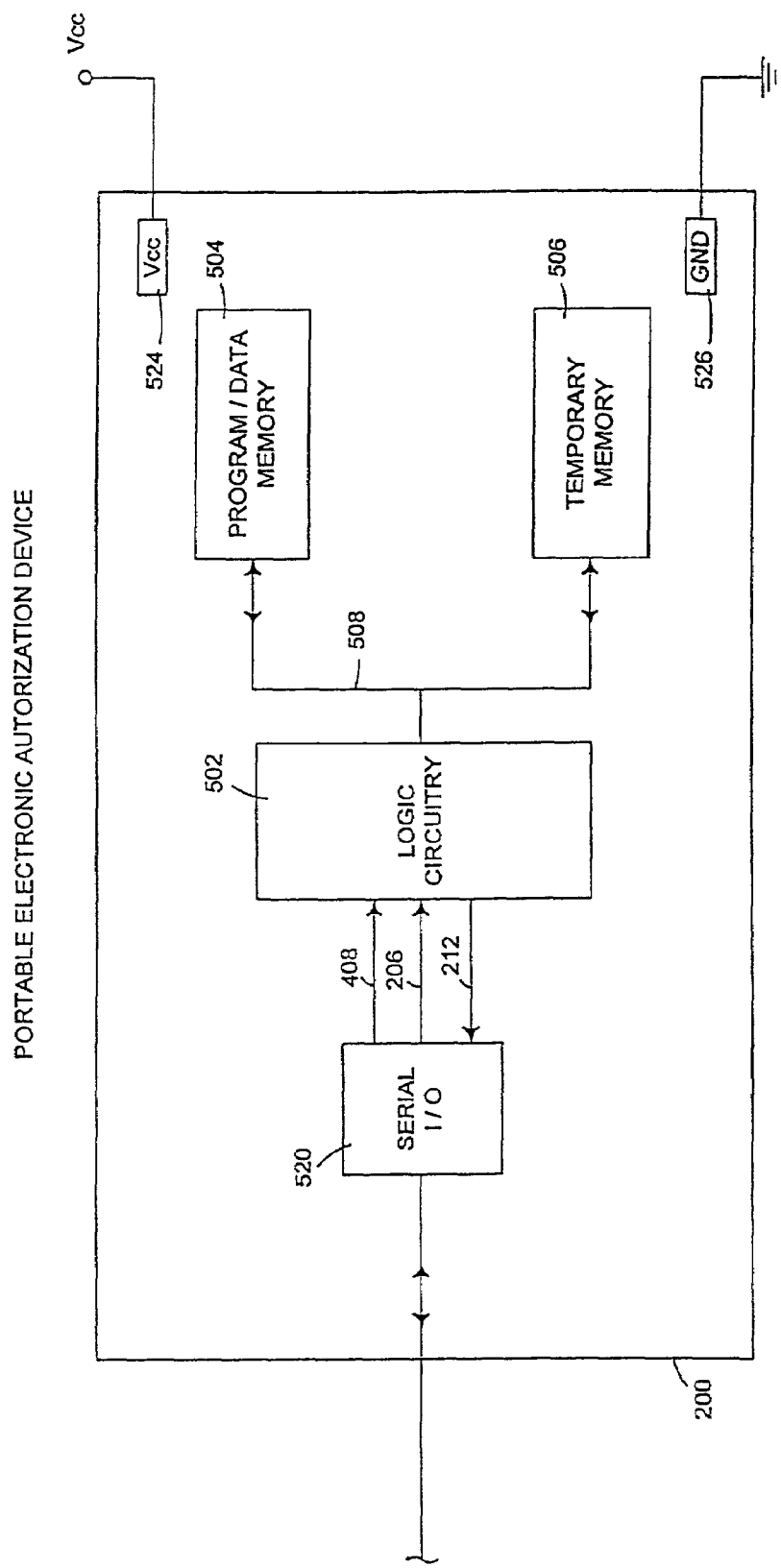
FIG. 5B illustrates one implementation of a PEAD wherein the PEAD circuitries are implemented on an IC.

FIG. 5B illustrates one implementation of a PEAD wherein the circuitries are implemented on an IC. In FIG. 5B, components having like reference numbers to components in FIG. 5A have similar functions. Data paths 408, 206, and 212, which have bene described in connection with FIG. 5A, is coupled to a serial I/O circuit 520, which facilitates data transmission and receipt in a serial manner on data path 522 between PEAD 200 and the electronic transaction system. Vcc pin 524 and ground pin 526, which provide power to PEAD 200 of FIG. 5B, are also shown.

Figure 5C:
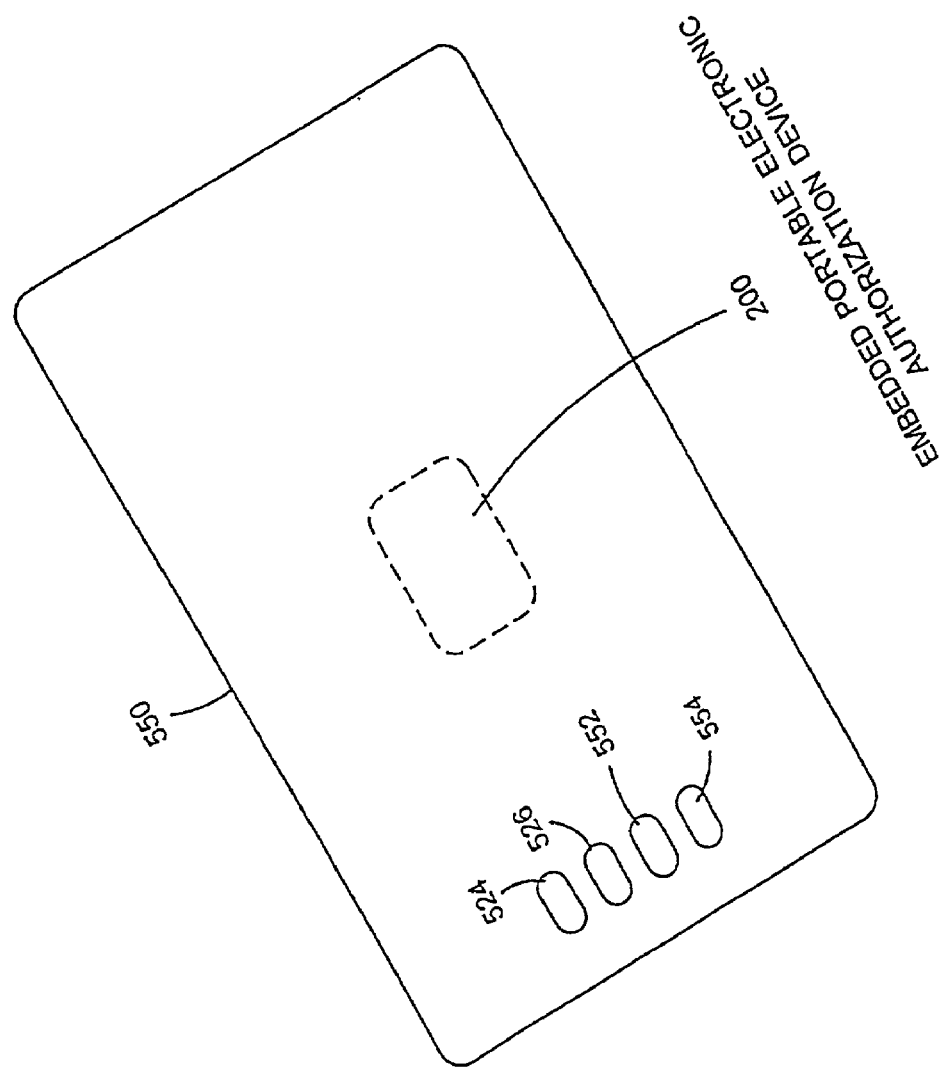
FIG. 5C represents an external view of the PEAD of FIG. 5B after being embedded in a card-like package.

FIG. 5C represents an external view of the PEAD of FIG. 5B after being embedded in a card-like package for ease of carrying and insertion into a serial I/O port of the electronic transaction system. Card 550, which embeds the integrated circuit implementing the inventive PEAD, includes, in one embodiment, four external contacts. External serial contacts 552 and 554 carry data and ground respectively to facilitate serial communication with a serial device of an electronic transaction system. External Vcc contact 524 and external ground contact 526, which supply power to the PEAD as discussed in connection with FIG. 5A, are also shown. When card 550 is inserted into an electronic transaction system, it is powered through external contacts 524 and 526, thereby enabling the PEAD circuitries therein to receive transaction requests via external serial contacts 552, and 554, approve the requests within the PEAD if appropriate, encrypt transaction approval data within the PEAD circuitries, and serially communicate the encrypted transaction approval data to the electronic transaction system via external serial contacts 552 and 554.

Figure 6A:
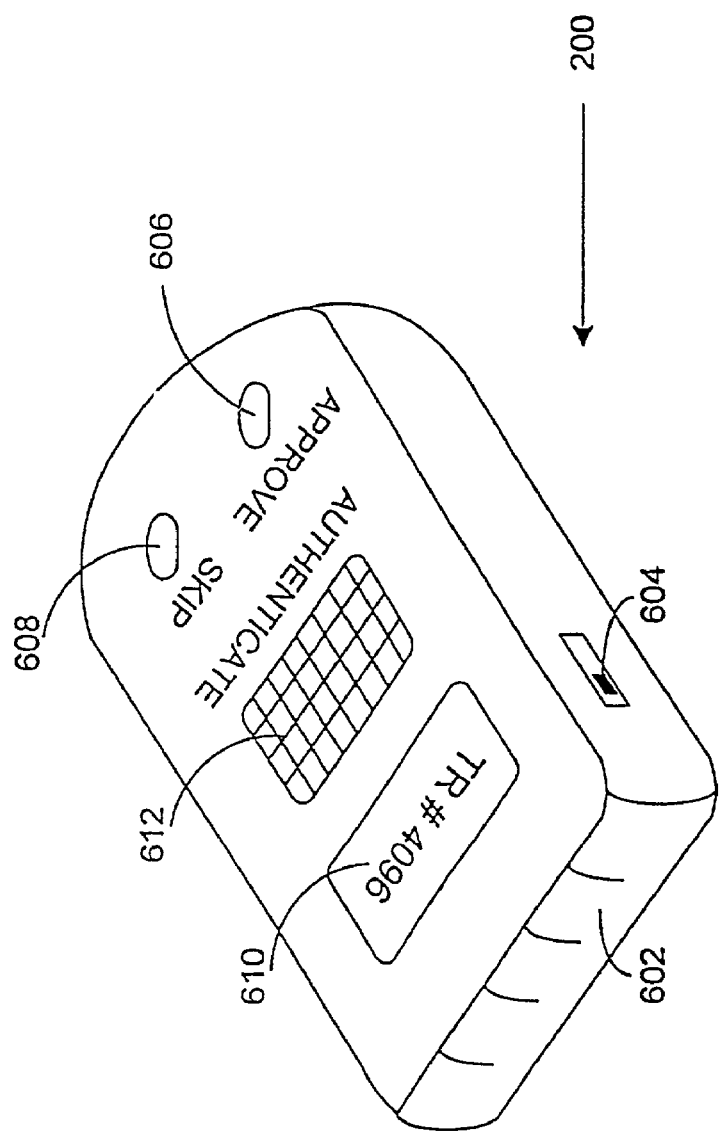
FIG. 6A illustrates an external view of the PEAD in accordance with a preferred embodiment of the present invention.

FIG. 6A represents an external view of PEAD in accordance with a preferred embodiment of the present invention. PEAD 200 of FIG. 6A is preferably implemented as a small, self-containing package that is sufficiently ruggedized for daily use in the field. Preferably, PEAD 200 of FIG. 6A is small enough to be comfortably carried with the user at all times, e.g., as a key chain attachment or a small package that can easily fit inside a purse or a wallet. The physical enclosure of PEAD 200 is preferably arranged such that the content will be tamper-proof (i.e., if it is opened in an unauthorized manner then the user's private key and/or the user identification data will be destroyed or the PEAD will no longer be able to approve transactions). By way of example, the enclosure may be arranged such that if it is opened, there is a change in the flow of current in a current path, e.g., either the existing current flow is interrupted or a current path that has been idle starts to flow. The change in the flow of current may then force RE.

There is shown an infrared communication port 602 for receiving and transmitting data vis-à-vis the electronic transaction system. A small on/off switch 604 permits the user to turn off the PEAD to conserve power when not in use. Approve button 606 permits the user to signify approval of a proposed transaction. Optional skip button 608 permits the user to indicate rejection of a particular transaction. Skip button 608 may be omitted since a transaction request may be understood, in some embodiment, as not being approved if approve button 606 is not activated within a given period of time after receiving the request.

Optional display 610 may be implemented using any type of display technology such as liquid crystal technology. Displays 610 displays, among others, the transaction being proposed for approval. Display 610 may be omitted if desired, in which case the transaction may be viewed, for example, at a display associated with the electronic transaction system itself. Optional user authentication mechanism 612 prevents PEAD 200 from being used for approving transaction sunless the user is able to identify himself to PEAD 200 as the rightful and authorized user. Optional user authentication mechanism 612 may require the user to enter a password, to furnish a fingerprint or a voice print, or other biometrics and/or identifying characteristics specific to the authorized user before PEAD 200 can be activated and employed for approving transactions.

FIG. 6B illustrates, in a simplified manner and in accordance with one aspect of the present invention, the hardware for impelmenting PEAD 200 of FIG. 6A. Battery 652 provides power to the circuitry of PEAD 200. A microcontroller 654 executes codes stored in flash memory 656 and employs random access memory 658 for the execution. In one embodiment, microcontroller 654, flash memory 656, and even random access memory 658 may be implemented on a single chip, e.g., a NC68HC05SCXX family chip from Motorola Inc. of Schaumburg, Ill. such as the NC68HC05SC28. Approve button 606 and optional skip button 608 are coupled to microcontroller 654 to permit the user to indicate approval or rejection of a particular transaction displayed using display circuitry 660. Communication to and from the electronic transaction system is accomplished under control of microcontroller 654 via an infrared transceiver 662. Power switch 664 permits the user to power off PEAD 200 when not in use to conserve power and to prevent accidental approval.

Figure 7:
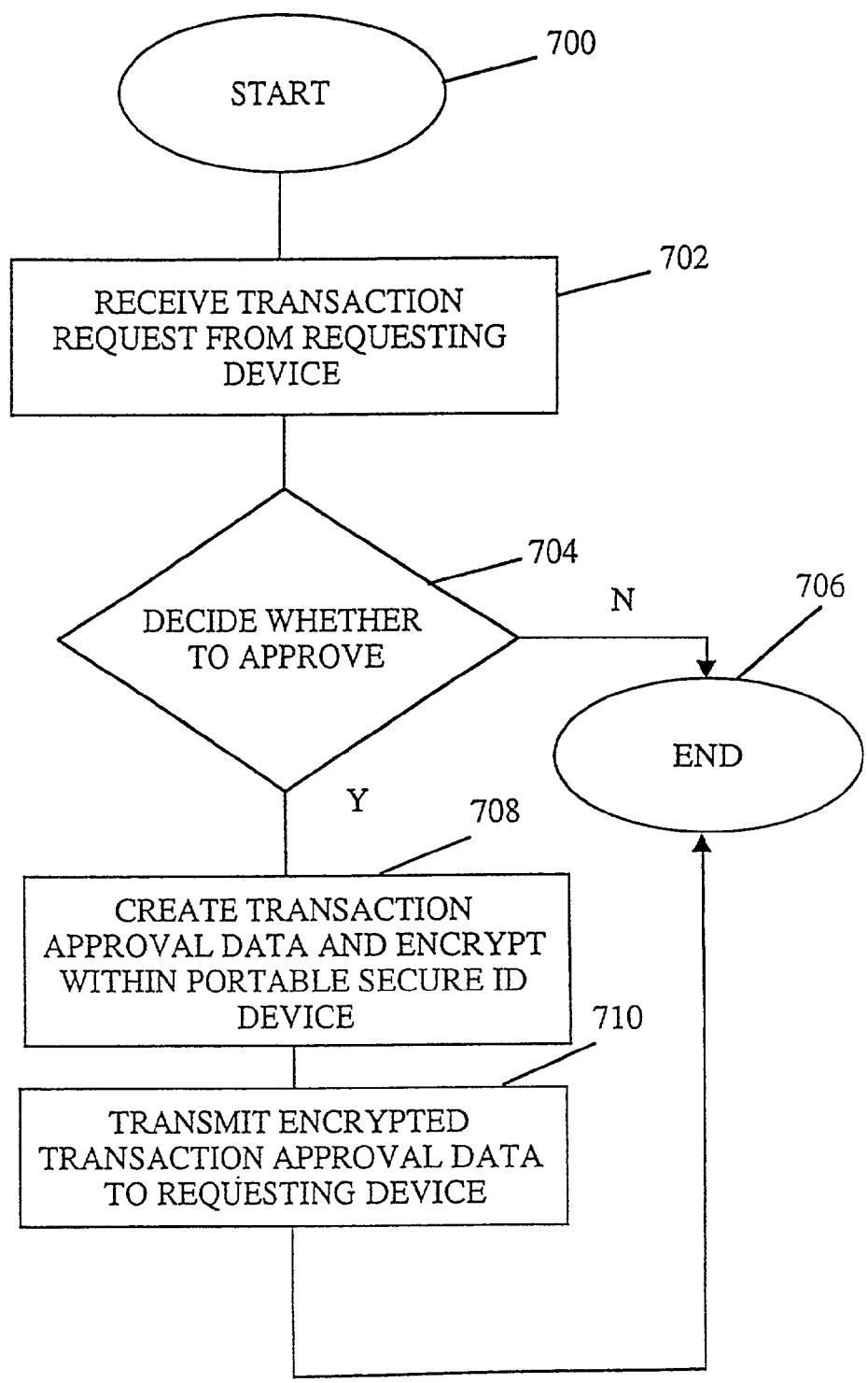
FIG. 7 is a flowchart illustrating, in accordance with one aspect of the present invention, the approval technique employing the inventive PEAD.

FIG. 7 is a flowchart illustrating, in accordance with one aspect of the present invention, the approval technique employing the inventive PEAD. In step 702, a transaction request is received at the PEAD from the requesting device associated with the electronic transaction system. In step 704, the user has the option whether to approve or disapprove the transaction proposed. If not approved, e.g., either by activating the skip button of the PEAD or simply allowing the request to time out, nothing will be done.

On the other hand, if the user approves the proposed transaction, the user may activate the approve button to create transaction approval data. The transaction approval data is then encrypted in step 708 within the PEAD. In step 710, the encrypted transaction approval data is transmitted to the requesting device of the electronic transaction system after being encrypted.

Figure 8:
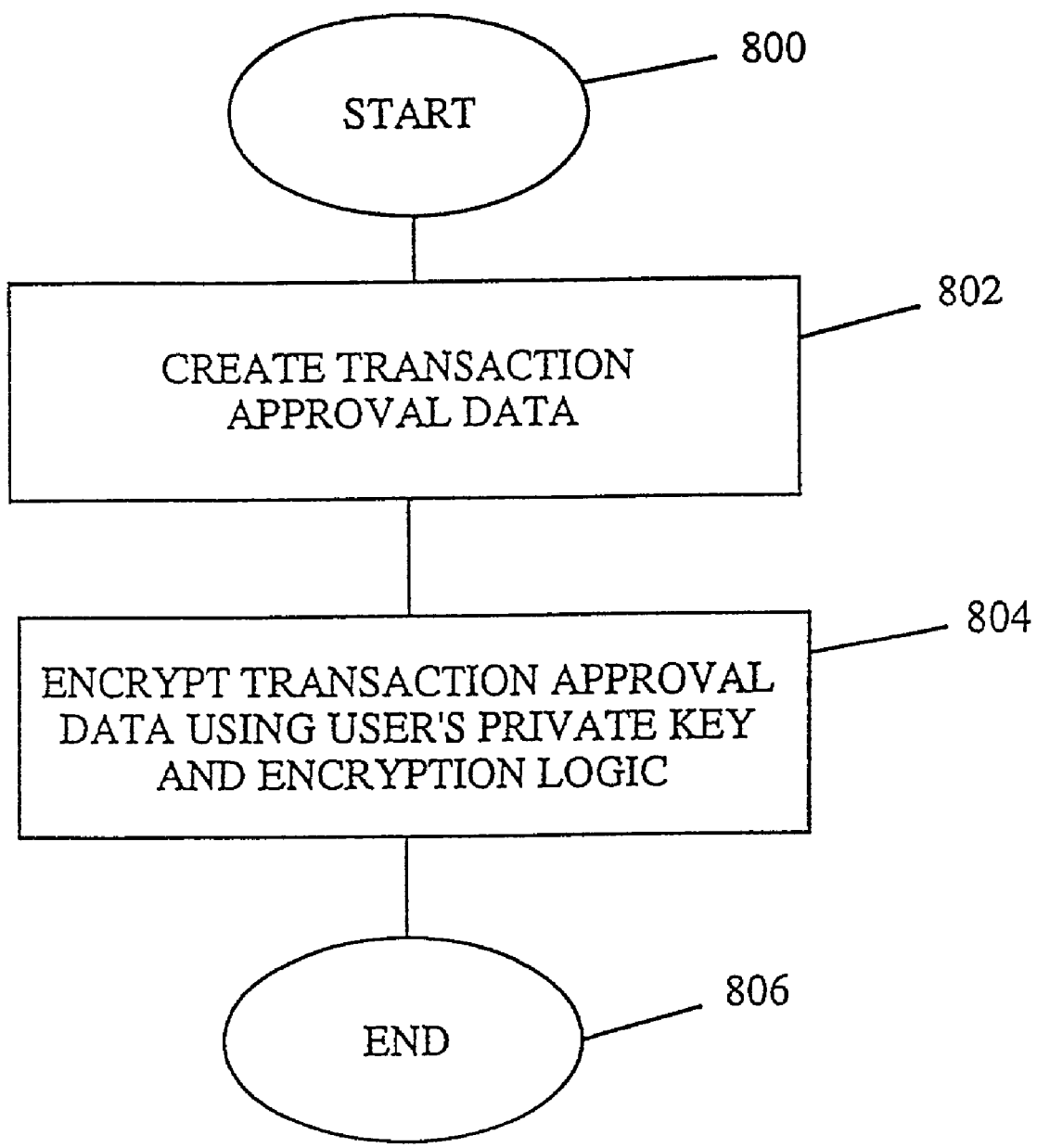
FIG. 8 is a flowchart illustrating, in accordance with one aspect of the present invention, steps involved in encrypting transaction approval data using a public key cryptography technique.

FIG. 8 is a flowchart illustrating, in accordance with one aspect of the present invention, the steps involved in encrypting transaction approval data using public key cryptography. In step 802, the transaction approval data package is created. As discussed earlier in connection with FIG. 3B, the transaction approval data may be created by appending any necessary user identification data to a portion of or the entire transaction request. Optionally, a time stamp may also be appended thereto. In step 804, the transaction approval data is encrypted using the user's private key, which is preferably kept secured at all times within the PEAD. Thereafter, the encrypted transaction approval data is transmitted back to the electronic transaction system.

In accordance with one aspect of the present invention, it is recognized that even if the encrypted transaction approval data is intercepted and decrypted for analysis by a third party, it is not possible to bypass the security features of the invention as long as the user's private key or the user identification data is secure. As mentioned earlier, since the user identification data is not accessible externally, it is always secure within the PEAD. This is unlike the prior art wherein the user is required to enter the identification data, e.g., password at the electronic transaction system and risks exposure of this sensitive data.

Even if the user identification data is compromised, transaction approval still cannot take place unless there is possession of the user's private key. It would be useless to intercept the encrypted transaction approval data even if one can decrypt it using the user's public key since the transaction partner, e.g., the merchant requesting approval of the transaction, will not accept any transaction approval data not encrypted using the user's private key. Again, since the private key is not accessible externally, it is always secure within the PEAD. This aspect of the invention has great advantages in performing on-line transactions since the user's private key no longer has to be stored in a vulnerable computer file in a workstation, which may be accessible by other parties and may be difficult to conveniently tote along for other authentication tasks.

The fact that the PEAD is implemented in a small, portable package makes it convenient and comfortable for the user to maintain the PEAD within his possession at all times. Even if the PEAD is physically stolen, however, the optional user authentication mechanism, e.g., user authentication mechanism 612 of FIG. 6A, provides an additional level of protection and renders the PEAD useless to all but the properly authenticated user. Of course the user can always notify the issuer of the PEAD if the PEAD is stolen or lost, and the issuer can inform transaction partners to refuse any transaction approval data encrypted with the user's private key of the stolen PEAD.

The fact that the transaction approval data includes the time stamp, the merchant's name, the amount approved, and any other relevant data also enhances the integrity of the approval process. If the merchant inadvertently or intentionally submits multiple transaction approvals to the issuer, the issuer may be able to recognize from these data items that the submissions are duplicates and ignore any duplicate transaction approval data. For example, the issuer may recognize that it is unlikely for a user to purchase multiple identical dinners at the same restaurant at a given time and date.

It is recognized by the inventor herein that although the PEAD and PEAD-enabled point of sale terminals offer a highly secure system for approving transactions, there exists a well-established and widely available charge card infrastructure, which includes millions of existing charge card point-of-sale terminals (e.g., charge card readers or ATM terminals) in use worldwide. It is further recognized that even in the absence of the PEAD-enabled point of sale terminals, certain PEAD functionality may offer improved transaction security vis-à-vis the existing charge card infrastructure.

In accordance with another aspect of the present invention, there is provided a portable electronic charge/approval device (PECAD), which not only offer the aforementioned PEAD functionality to permit a user to approve a transaction vis-à-vis a PEAD-enabled point of sale terminal, but also to permit the user to conduct transactions vis-à-vis the existing charge card infrastructures. In particular, the complete PECAD system includes a PECAD and an associated emulation card which conforms to current charge card standards as far as its interface with existing charge card readers is concerned. The emulation card can flexibly be configured by the PECAD to appear as an ordinary charge card reader. Together, the PECAD and the emulation card form a secure system for conducting transactions vis-à-vis the existing charge card infrastructure.

Note that as the term is employed in the context of this embodiment, charge cards encompass both magnetic-stripe cards and electronic smart cards. The charge cards themselves may represent credit cards (such as Visa or Master Cards), ATM cards, royalty cards, discount cards, as well as any other type of cards which a user may employ vis-à-vis a point-of-sale terminal to obtain cash, goods, and/or services.

Prior to conducting a transaction, the PECAD has in its memory charge card data pertaining to one or more charge cards of the user. To perform the PEAD functionality, the memory may also include other data items discussed earlier in connection with the PEAD. The charge card data may be input in advance from the actual charge cards themselves using the appropriate R/W mechanism of the PECAD.

Since the PECAD contains the PEAD functionality, it may of course be employed to approve transactions vis-à-vis a PEAD-enabled point of sale terminal in the manner earlier discussed in connection with the PEAD. In the absence of a PEAD-enabled point of sale terminal, however, the emulation card is employed instead to conduct the transaction vis-à-vis the existing charge card infrastructure.

To conduct a transaction using the emulation card, the user first request that the PECAD writes charge card data pertaining to a selected charge card to the emulation card. The selected charge card may be selected by the user prior to writing. Since a single emulation card can emulate any number of charge cards, this single emulation card can advantageously replace the multiple charge cards that a user must carry nowadays. Preferably, the user is first properly authenticated, using an appropriate authenticatin mechanism associated with the PECAD, prior to being allowed to use the PECAD to write charge card data to the emulation card.

After the emulation card is written with the charge card data associated with the user-selected charge card, the user may employ the emulation card as if it were a charge card for the purpose of completing the transaction. That is, since the emulation card conforms to the I/O requirements of existing charge cards and charge card readers, it may be read by an existing charge card reader as if it were a charge card.

Once the transaction is completed, the user may optionally employ the PECAD to erase the charge card data from the emulation card, thereby rendering the emulation card useless for the purpose of conducting further transactions until the properly authenticated user again authorizes the PECAD to write charge card data onto the emulation card. If the emulation card emulates the electronic smart card, the emulation card may be rendered incapable of use for further transactions by, for example, configuring the registers or flags within the emulation card appropriately. Thus, even if the emulation card is stolen, it is useless to an unauthorized user. Furthermore, even if the emulation card and the PECAD are stolen together, the emulation card itself cannot be written with charge card data unless the user is properly authenticated. This is in sharp contrast to the existing situation wherein, for example, a stolen credit card still contains in its magnetic stripe all the necessary information to conduct a transaction. For further security, the emulation card itself may be physically signed by the properly authorized user and may contain a picture of the authorized user to allow merchants to visually ascertain whether the person conducting the transaction is in fact the rightful owner of the emulation card.

In a preferred embodiment, each emulation card is matched, in a substantially unique manner, with a specific PECAD to further enhance security. In this situation, a given PECAD can only write charge card data into the emulation card uniquely associated with it. By way of example, an emulation card may be endowed with appropriate optically encrypted marks (such as holograms), magnetically encrypted marks (such as magnetically stored bits) or mechanically encrypted marks (such as randomly spaced holes) so that it can be written only by a specific PECAD.

Preferably, each emulation card is matched with a single unique PECAD. It should be noted, however, this unique matching aspect is not required to be a mathematical absolute (although such may be preferred). One skilled in the art will readily appreciate that given a sufficiently large number of issued emulation cards and PECAD, some overlap may occur that renders it possible (albeit remotely in real life) that a given emulation card may be recognized by more than one PECAD. In fact, the issuer or manufacturer may posses a master PECAD that is capable of recognizing a number of issued emulation cards. Thus, the association between an emulation card and a PECAD is substantially unique in the sense that a door key is substantially unique to each door lock, not ruling out the potentiality that a manufacturer may choose to make an emulation card absolutely unique relative to a given PECAD or the remote possibility that in the millions of door locks manufactured, a given key may open more than one door lock. Preferably, the encrypted marks and geographic distribution pattern of the emulation cards/ PECADs (e.g., within the same city or state) be arranged that such remote possibility is minimized.

Because each emulation is substantially uniquely matched with a specific PECAD, even if a PECAD is stolen and the authentication mechanism is successfully bypassed by a person intending to commit fraud, the stolen PECAD still cannot be used to write charge card data into any arbitrary blank emulation card for the purpose of conducting fraudulent transactions. As a further advantage, the requirement that a given PECAD can only write (after proper authentication) to the emulation card substantially uniquely associated with it substantially eliminates the accidental overwriting of an existing charge card by the PECAD.

Figure 9:
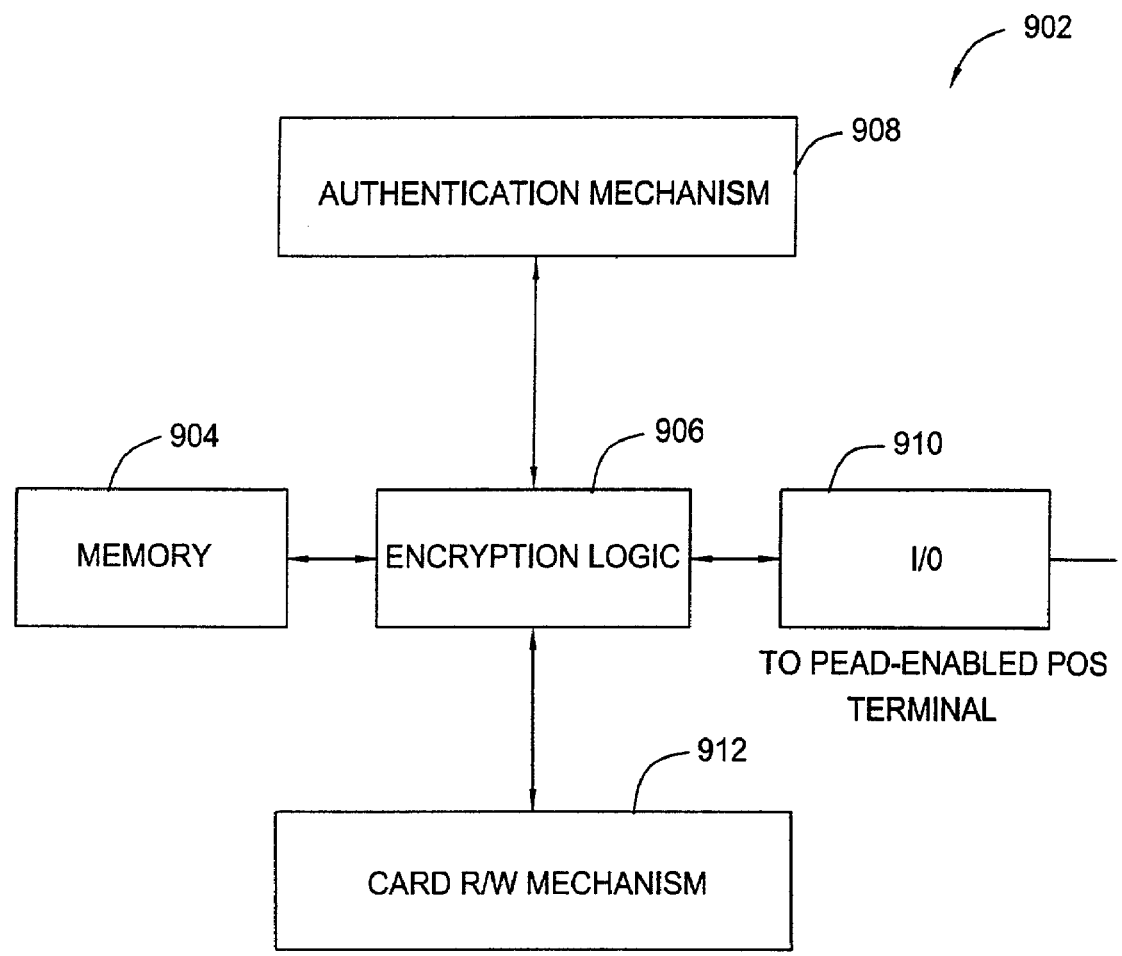
FIG. 9 illustrates, in accordance with one aspect of the present invention, a simplified block diagram of a portable electronic charge and authorization device (PECAD).

FIG. 9 illustrates, in accordance with one aspect of the present invention, a simplified block diagram of PECAD 902. In FIG. 9, a memory 904 is preferably nonvolatile, tamper-proof memory and serves the same function as the memory circuit in the PEAD, except that memory 904 may also be employed to store the encrypted charge card data pertaining to one or more charge cards of the user. Encryption logic 906 performs the same encryption/decryption/security function as the encryption logic discussed in connection with the PEAD. That is, access to data stored in memory 904, including the user's private key, the user's personal data, and the charge card data, is preferably facilitated only through encryption logic 906.

Authentication mechanism 908 performs the same user authentication function discussed in connection with the PEAD. I/O circuitry 910 represents the circuitry that permits the PECAD to communicate with a PEAD-enabled point of sale terminal if it is available for the purpose of approving transactions. The transaction approval aspect has been discussed earlier in connection with the PEAD and will not be belabored here. I/O circuitry 910 may be omitted on certain PECAD models if it is expected that such PECAD models do not communicate with a PEAD point of sale terminal and are employed only to configure emulation cards for the purpose of conducting transactions vis-à-vis the existing charge card infrastructure.

Card R/W mechanism 912 represents the mechanism employed to write selected charge card data to the emulation card and to erase the emulation card after the transaction is completed. If the charge card data is acquired by reading in existing charge cards, card R/W mechanism 912 also includes the ability to read in existing charge cards for the purpose of storing the charge card data to memory 904 (through encryption logic 906). Note that data read through card R/W mechanism 912 is encrypted by encryption logic 906 prior to being stored within memory 904. Likewise, stored data (such as charge card data) in memory 904 is first decrypted by encryption logic 906 prior to being written to an emulation card via card R/W mechanism 912.

Figure 10:
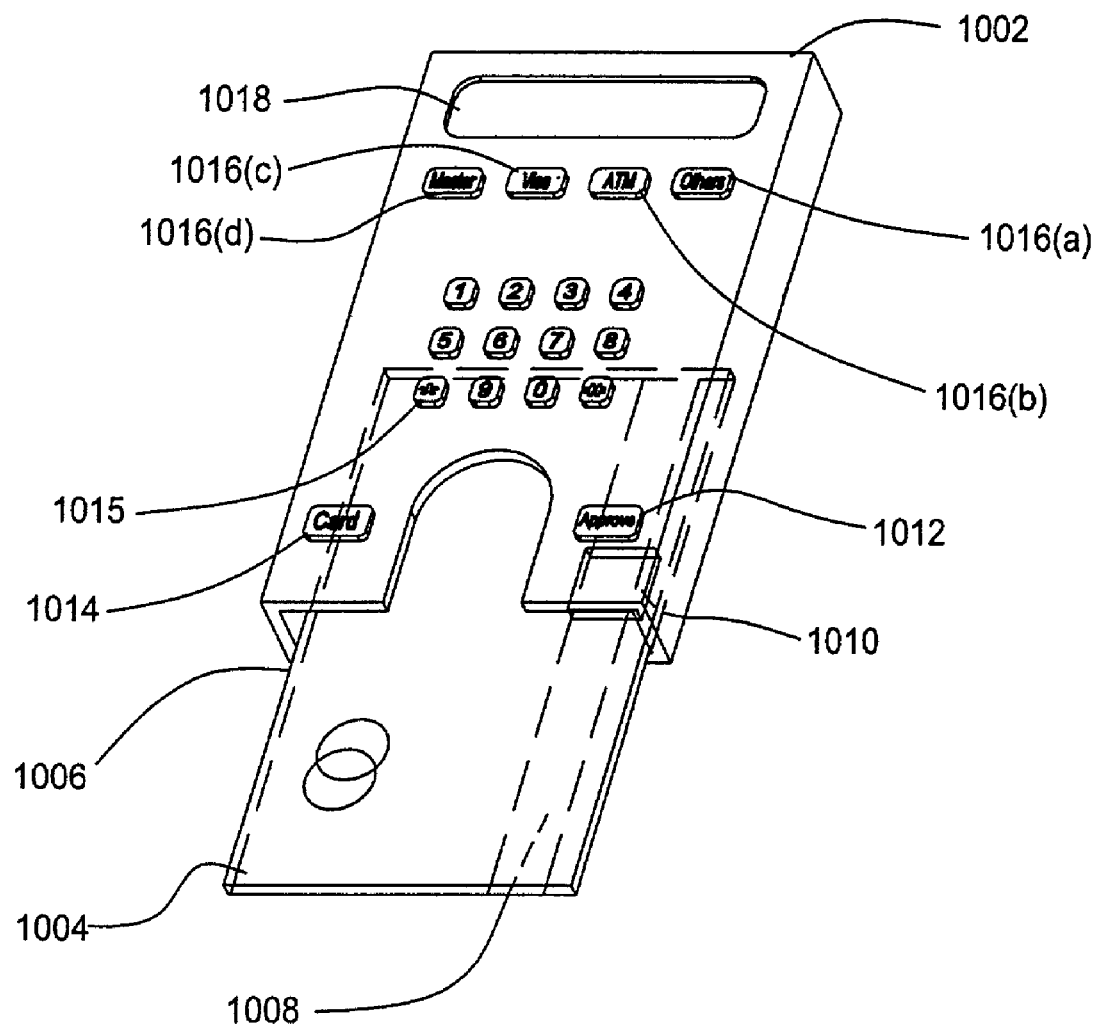
FIG. 10 is a simplified view of a PECAD, including an emulation card disposed therein, in accordance with one embodiment of the present invention.

FIG. 10 is a simplified sketch of a PECAD 1002, including an emulation card 1004 disposed therein. Emulation card 1004 is removable from slot 1006 for the purpose of completing transactions vis-à-vis an existing charge card reader. In the example of FIG. 10, emulation card 1004 includes a magnetic stripe 1008 to emulate a magnetic stripe charge card. As mentioned earlier, however, emulation card 1004 may be configured to emulate any type of charge card interface, including IC contacts. A card R/W mechanism 1010 is shown in an outline format to indicate that it is part of PECAD 1002. Through card R/W mechanism 1010, data may be read from an existing charge card or written to an emulation card. Key pads 1015 can be used as authentication mechanism as described as in 612 as well as 908. User can key in the password or PIN to activate the PECAD to write the charge card data to the emulation card 1004.

Approve button 1012 is substantially similar to approve button 606 of FIG. 6A and may be employed to approve a transaction via a PEAD-enabled point of sale terminal. Card button 1014 on the other hand on the other hand indicates the user's desire to complete the transaction via the emulation card. Card selector buttons 1016(a)–(d) are exemplary selections which may be chosen by the user to select the specific charge card that may be employed to conduct the transaction. A display 1018 may be employed to display the charge card data, such as charge card number, expiration date, name of holder, etc. of the selected charge card to allow a merchant to copy such information, if desired, to complete the transaction.

Figure 11:
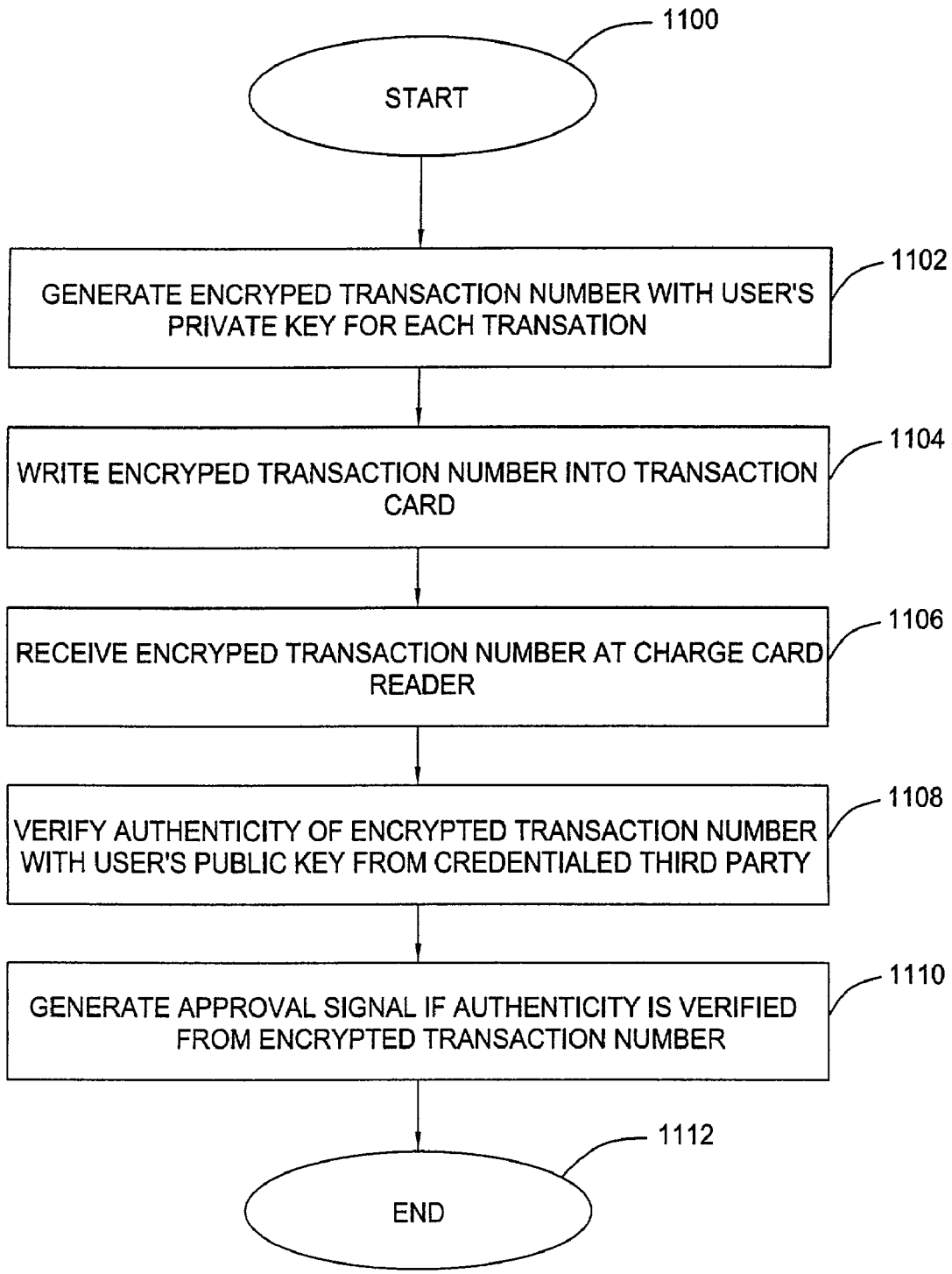
FIG. 11 is a simplified flowchart, illustrating in accordance with one embodiment, how a transaction number may be employed in conjunction with a PECAD system to improve transaction security.

In accordance with another aspect of the present invention, transaction security is further enhanced by using the PECAD to write an encrypted transaction number or other encrypted data that has been encrypted using the user's private key (which is stored in secure nonvolatile memory of the PECAD) to the emulation card. FIG. 11 illustrates, in accordance with one embodiment, this aspect of the present invention. In step 1102, a unique transaction number is generated and encrypted with the user's private key for each transaction. In step 1104, the encrypted transaction number is written from the PECAD to the emulation card. If the emulation card emulates a magnetic stripe card, for example, the encrypted transaction number may be written to one of the existing but unused tracks or one of he reserve tracks, e.g., track 3 on the magnetic stripe. In step 1106, software in the charge card reader may instruct the charge card reader to receive the encrypted transaction number which is then authenticated using a user's public key that has been obtained form a credentialed third party (step 1108); or in step 1106, the charge card reader reads in the encrypted transaction number, which is then sent to the credit clearance center such as Master Card or Visa Card and the credit clearance center would authenticate the user by using a user's public key that has been obtained from a credentialed third party (step 1108). Typically some form of user identification may be sent to the credentialed third party to facilitate obtaining the public key. By way of example, the user ID or the public key ID may be read by the charge card reader and transmitted to the credentialed third party to obtain the public key. The public key ID may represent, for example, the unique pattern of bits in the public key (e.g., the lowest 32 bits or 64 bits) that may be transmitted to the receiving site for public key searching and decryption. If authenticated, the transaction is then approved, enabling the merchant to release the goods/service to the user (step 1110).

As can be appreciated from the foregoing, the invention requires substantially no hardware change to the existing charge card readers and the existing charge card infrastructure. The change merely relates to software change, which instructs the existing charge card reader to read in the encrypted transaction number and which authenticates the encrypted transaction number using a user's public key obtained from a credentialed third party.

Further, there may be no change at all in the charge card reader. Instead, the credit clearance center software may be notified to authenticate the encrypted transaction number using the user's public key obtained from the credentialed third party. The charge card reader just read in all the data from the charge card or emulation card and verbatimly send all the information to the credit clearance center for approval. In this manner, this embodiment minimizes the changes that need to be made to the existing charge card infrastructure (i.e., changes only have to be made at a single location in the credit clearance center, and not in the millions of charge card readers in existence.

If additional security is desired, the user may key in at the PECAD the transaction amount and/or the time of the transaction. These pieces of data may also be encrypted using the user's private key and written to the emulation card to be received by the chrge card reader and decrypted at the credit clearance center using the user's public key, which is again preferably obtained from a credentialed third party. In this case, approval of the transaction is given only if the transaction is for the amount indicated in the encrypted and received transaction amount and/or if the transaction occurs within a predefined time period of the encrypted and received transaction time (which was written from the PECAD to the emulation card previously). Thus, even if the emulation card is stolen, it is useless for other subsequent transactions, even if erasure or reconfiguration of the emulation card did occur.

In the internet transaction, a user can approve the transaction using PEAD or PECAD by encrypting the amount he approved using his own private key stored in the PEAD or PECAD. Thereafter, he can copy the encrypted information displayed on the PEAD display 610 or PECAD display 1002 is preferably in a human readable format such as in alpha numeric string to render it simple for the user to read and manually enter (by for example keying in or by speech command) to the computer connected through the Internet to conduct the Internet transaction. If necessary, one can also encrypt the credit card number together with the transaction information using the PEAD or PECAD to conduct secure Internet transactions. Of course the manual entering/keying technique, which desirable for backward compatibility, may be equally substituted by other forms of data entry, e.g., wireless or infrared communication via an appropriate port in the computer and PECAD (or PEAD) to allow data to be transmitted over the Internet.

As mentioned earlier, it is preferable that authentication of the user's identity be ascertained using the user's public key that is kept by a credentialed third party. The credentialed third party may represent, for example, any entity in which the public has a fairly high level of trust, such as an organization known to have or has a self-interest to have a trustworthy reputation. Examples include government organizations, banks, large corporations, or the like.

The credentialed party maintains a PECAD public key directory service that associates the list of manufacturer-provided public keys with users. When the user first acquires (via purchase or issuance by an issuer, for example) a PECAD, the user can register his ownership of the PECAD with the credentialed third party. Depending on the integrity of the registration process, the user is assigned a validation level, which indicated the degree of confidence that the person completing the registration is in fact who he says he is.

By way of example, the user may register simply by furnishing via email, phone, or regular mail personal information such as social security number, home address and home phone number, along with the PECAD serial number and public key signature (which is a unique sequence of numbers assigned by the manufacturer to a particular PECAD and which can be read from the PECAD by pressing a designated sequence of keys). The PECAD public key directory center may then user the PECAD serial number provided by the user as the unique searching ID to search for the Public Key in the database, once it finds the Public Key and it will use the Public Key signature provided by the user to verify against the Public Key in the database. If the verification is successful, then the user may be registered. Otherwise the user will be rejected. The public key is preferably unique.

The more secure way to register a user's ownership may be as follows (the process usually occurs at the place of purchase of the PECAD/PEAD or at the issuer, e.g., a bank). The issuer first activates the PEAD/PECAD using the manufacturer-provided password. Thereafter, the PEAD/PECAD user may overwrite the manufacturer-provided password with the user's password or other authentication mechanism(s). The user may then instruct the PEAD/PECAD to internally generate a new pair of private/public key (called user private key and user public key) inside the PEAD/PECAD. The user may also instruct the PEAD/PECAD to encrypt the personal information (such as social security information, home address, etc.) and the new user public key using the manufacturer-provided private key, which is pre-stored in the PEAD/PECAD to generate the user registration message. This manufacturer-provided private/public key pair may be generated by the PEAD/PECAD when the PEAD/PECAD is manufactured.

The issuer may then encrypt the PEAD/PECAD serial number and user registration message using the public key directory service center's public key to generate the registration message and transmit the registration message to the public key directory service center. Upon receiving the registration message, the public key directory service center may then decrypt the registration message using its own private key. Thereafter, the public key directory service center may use the PEAD/PECAD serial number to search for the manufacturer-provided key found in the database. If the decryption is successful, then update the manufacturer-provided public key with the new user public key in the directory service database and update the personal information in the directory service database and generate the public key ID using, for example, the person name+phone number or the lowest 32-bit (or 64 bit) of the public key for future referencing purposes. On the other hand, if decryption is unsuccessful, the user may then be rejected.

This registration process is generally accorded a low validation level since it is possible that someone other than the user may have fraudulently obtained the user's personal information for the purpose of registering ownership (and making the user responsible for the fraudulent charges that follow once registration is completed and the PECAD is activated).

An intermediate validation level may be obtained by furnishing, in addition to the information provided to acquire a low validation level, information which offers a higher degree of confidence that the person furnishing the information is indeed who he says he is. By way of example, the addition information may take the form of a photograph, signature, notary public's seal, or a combination of the above. A high validation level may be obtained by furnishing information which offers an even higher degree of confidence that the person furnishing the information is indeed who he says he is. By way of example, the registrant may appear in person at the PECAD public key directory center to present a photograph, a signature, a biometrics sample (such as fingerprint, retina scan, DNA print, or the like) or a combination of the above.

Once registration is completed, the PECAD public key directory by the credentialed third party may be consulted by credit clearance centers or merchants for the purpose of authenticating the user and approving transactions.

The PECAD public key directory may also be enhanced by establishing an insurance policy that protects merchants or credit clearance centers from financial loss due to, for example, fraud stemming from a defective registration process. The coverage provided by the insurance policy may be scaled according to the validation level, with the higher validation levels being eligible for a higher amount of coverage.

While this invention has been described in terms of several preferred embodiments, there are alteration, permutations, and equivalents which fall within the scope of this invention. It should also be noted that there are many alternative ways of implementing the methods and apparatuses of the present invention. By wat of example, while the discussion herein has focused on transaction approvals, it should be apparent to those skilled that the PEAD may be employed to conduct any kind of transaction vis-à-vis an electronic transactions system any time secured data transmission from the user to the electronic transaction system is preferred. For example, the PEAD may be employed for logging into highly sensitive computer systems or facilities. When so implemented, the computer terminal with which the PEAD communicates may be equipped with an infrared port, a magnetic reader port, or a contact-type plug for communication with the PEAD. The user may then employ the PEAD to perform any type of authentication tasks online.

As a further example, the PEAD may be employed to "sign" any computer file for authentication purposes (e.g., to authenticate the date or the user). The transaction approval data may then be saved along with the file to be authenticated for future reference. Note that the transaction authentication data is again tamper-proof since any transaction authentication data not encrypted using the user's private key will not be accepted as authentic. Also, it should be apparent that if the PEAD is employed to approve only predefined transactions, the transaction data may be stored in advance within the PEAD and do not need to be received from externally by the PEAD. It is therefore intended that the following appended claims be interpreted as including all such alterations, permutations, and equivalents as fall within the true spirit and scope of the present invention.

What is claimed is:

1. A method for permitting a user to conduct a charged transaction utilizing a charge terminal of an electronic transaction system, the charge card terminal being configured to interface with a charge card for the purpose of conducting the charge card transaction, providing a merchant where the charge card transaction is to be conducted, comprising
   accepting at a charge card terminal for the merchant where the charge card transaction is to be conducted to accept the merchant card and a pin number or cellular phone number from the user conducting the charge card transaction,
   detecting the use of the merchant card at a central processing payment server,
   the payment server using the transaction associated phone number or pin number as an index to a database which stores a cellular phone number for the person required to authorize the transaction,
   the database further stores a record of whether the authorizers cellular phone has an imbedded portable electronic authorizing action device (PEAD),
   in response to said detection step, utilizing the phone number or pin number to cause a call to be placed to a cellular phone of a person required to authorize the charge card transaction, sending a report of the users charge card transaction to the cellular phone, and authorizing approval of the charge card transaction back to the merchant's charge card terminal only upon approval by the authorized persons,
   the authorizing person approving the transaction by entering a pin number at the cellular phone into the PEAD.

2. A method as claimed in claim 1 wherein the merchant further enters the amount to be charged.

3. A method as claimed in claim 1 wherein the merchant further enters an identification of the type transaction being conducted.

4. A method as claimed in claim 1 wherein the merchant card is assigned a valid credit card number, the valid credit card number of the merchant being detected to initiate the step of calling the authorizing persons cellular phone.

5. A method as claimed in claim 1 comprising the further step of filtering all credit card transactions from the charge card terminal of the merchant through a central processing server, and in response to that filtering step,
   If the card number received from the merchant is not a unique merchant assigned number, then the server does nothing,
   Else if the card number is a unique merchant assigned number, then look up information in the database in the payment server using the phone number or pin number as the index.

6. A method as claimed in claim 1 wherein if the database lockup indicates that the authorizing person's cellular phone is a touchtone phone, then the server will send a message to the authorizing person's cellular phone requesting a dial tone pin for approval.

7. A method as claimed in claim 1 or claim 5, wherein the party controlling the payment server is the issuer of the merchant card.

8. A method as claimed in claim 1 wherein upon determining that the authorizing person's cellular phone has the PEAD, the server sends a transaction message to the authorizing to the authorizing person's phone for approval using the PEAD imbedded in the phone.

9. A method as claimed in claim 6, wherein upon the authorizing person authorizing/approving the transaction, a settlement is made to the authorizing person's account utilizing an account selected from the group comprising a credit card, an ATM, a bank account or a debit card.

10. A method as claimed in claim 6 wherein the database server utilizes an interactive voice response system to convey the transaction information to the authorizing person's cellular phone.

* * * * *

UNITED STATES PATENT AND TRADEMARK OFFICE
CERTIFICATE OF CORRECTION

PATENT NO. : 7,089,214 B2 Page 1 of 1
APPLICATION NO. : 10/057465
DATED : August 8, 2006
INVENTOR(S) : Ynjiun P. Wang It is certified that error appears in the above-identified patent and that said Letters Patent is hereby corrected as shown below:

On the cover page, item 54, and column 1, lines 1-5 please replace the title "METHOD FOR UTILIZING A PORTABLE ELECTRONIC AUTHORIZATION DEVICE TO APPROVE TRANSACTIONS BETWEEN A USER AND AN ELECTRONIC TRANSACTION SYSTEM", with --PAYMENT SYSTEM--

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,089,214 B2 | Page 1 of 1 |
| APPLICATION NO. | : 10/057465 | |
| DATED | : August 8, 2006 | |
| INVENTOR(S) | : Ynjiun P. Wang | |

It is certified that error appears in the above-identified patent and that said Letters Patent is hereby corrected as shown below:

On the title page, item 54, and column 1, line 1 please replace the title "PAYMENT SYSTEM", with --METHOD FOR UTILIZING A PORTABLE ELECTRONIC AUTHORIZATION DEVICE TO APPROVE TRANSACTIONS BETWEEN A USER AND AN ELECTRONIC TRANSACTION SYSTEM--

Signed and Sealed this

Twenty-third Day of November, 2010

David J. Kappos
*Director of the United States Patent and Trademark Office*